US009887568B2

(12) United States Patent
Yamazaki et al.

(10) Patent No.: US 9,887,568 B2
(45) Date of Patent: Feb. 6, 2018

(54) MOVING OBJECT, WIRELESS POWER FEEDING SYSTEM, AND WIRELESS POWER FEEDING METHOD

(75) Inventors: Shunpei Yamazaki, Tokyo (JP); Jun Koyama, Kanagawa (JP); Yutaka Shionoiri, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 616 days.

(21) Appl. No.: 13/023,122

(22) Filed: Feb. 8, 2011

(65) Prior Publication Data

US 2011/0199028 A1    Aug. 18, 2011

(30) Foreign Application Priority Data

Feb. 12, 2010   (JP) .................................. 2010-028706

(51) Int. Cl.
*H02J 7/00*    (2006.01)
*H02J 7/14*    (2006.01)
(Continued)

(52) U.S. Cl.
CPC ........... *H02J 7/0054* (2013.01); *B60L 11/007* (2013.01); *B60L 11/182* (2013.01); *B60L 11/1833* (2013.01); *H02J 7/1407* (2013.01); *H02J 17/00* (2013.01); *B60L 2200/10* (2013.01); *B60L 2200/12* (2013.01); *B60L 2200/26* (2013.01);
(Continued)

(58) Field of Classification Search
USPC ........................... 320/104, 108, 109; 375/267
See application file for complete search history.

(56) References Cited

U.S. PATENT DOCUMENTS 4,560,916 A   12/1985 Yoshiyuki et al.
5,524,044 A    6/1996 Takeda
(Continued)

FOREIGN PATENT DOCUMENTS

CN      001479183 A     3/2004
EP      2 196 351 A1    6/2010
(Continued)

OTHER PUBLICATIONS

Chinese Office Action re Application No. CN 201110039854.7, dated Mar. 21, 2014.
(Continued)

*Primary Examiner* — Samuel Berhanu
(74) *Attorney, Agent, or Firm* — Husch Blackwell LLP

(57) ABSTRACT

An object is to provide a moving object structure capable of reducing power loss caused when power is supplied from a power feeding device to a moving object by wireless communication. Another object is to provide a moving object structure capable of reducing the intensity of radio waves radiated to the surroundings. A moving object having a plurality of antennas receives radio waves transmitted from a power feeding device. At least one of the plurality of antennas is installed apart from the other antenna(s) of the moving object. Then, the radio waves transmitted from the power feeding device are received by all the plurality of antennas and converted into electric energy. Alternatively, the radio waves transmitted from the power feeding device are received by one or more selected from the plurality of antennas and converted into electric energy.

23 Claims, 22 Drawing Sheets

(51) Int. Cl.
*H02J 17/00* (2006.01)
*B60L 11/00* (2006.01)
*B60L 11/18* (2006.01)

(52) U.S. Cl.
CPC ........ *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 5,654,621 | A | 8/1997 | Seelig |
| 5,821,731 | A | 10/1998 | Kuki et al. |
| 5,850,135 | A | 12/1998 | Kuki et al. |
| 6,026,921 | A | 2/2000 | Aoyama et al. |
| 6,157,162 | A * | 12/2000 | Hayashi et al. ............. 320/104 |
| 6,837,438 | B1 | 1/2005 | Takasugi et al. |
| 7,450,910 | B2 | 11/2008 | Aoki |
| 7,674,650 | B2 | 3/2010 | Akimoto et al. |
| 7,737,658 | B2 | 6/2010 | Sennami et al. |
| 7,945,502 | B2 | 5/2011 | Mashinsky et al. |
| 8,008,888 | B2 | 8/2011 | Oyobe et al. |
| 8,030,888 | B2 * | 10/2011 | Pandya et al. ............... 320/109 |
| 8,064,825 | B2 | 11/2011 | Onishi et al. |
| 8,115,342 | B2 | 2/2012 | Kawasaki |
| 8,278,784 | B2 | 10/2012 | Cook et al. |
| 8,466,654 | B2 * | 6/2013 | Cook ................... B60L 11/182 320/104 |
| 8,487,481 | B2 | 7/2013 | Cook et al. |
| 8,729,859 | B2 | 5/2014 | Cook et al. |
| 8,890,472 | B2 | 11/2014 | Mashinsky |
| 9,090,170 | B2 | 7/2015 | Mashinsky et al. |
| 9,256,905 | B2 | 2/2016 | Mashinsky et al. |
| 9,569,805 | B2 | 2/2017 | Mashinsky et al. |
| 9,697,575 | B2 | 7/2017 | Mashinsky et al. |
| 2002/0157881 | A1 | 10/2002 | Bakholdin et al. |
| 2005/0254183 | A1 | 11/2005 | Ishida et al. |
| 2006/0022636 | A1* | 2/2006 | Xian et al. .................... 320/108 |
| 2007/0182367 | A1* | 8/2007 | Partovi ................... H01F 5/003 320/108 |
| 2007/0216348 | A1 | 9/2007 | Shionoiri et al. |
| 2008/0056402 | A1* | 3/2008 | Jang et al. .................... 375/267 |
| 2008/0136627 | A1* | 6/2008 | Hayakawa ................... 340/540 |
| 2008/0210762 | A1 | 9/2008 | Osada et al. |
| 2009/0045773 | A1 | 2/2009 | Pandya et al. |
| 2009/0189458 | A1 | 7/2009 | Kawasaki |
| 2010/0025677 | A1* | 2/2010 | Yamazaki et al. ............. 257/43 |
| 2010/0140455 | A1* | 6/2010 | Nathan .................... G01D 5/24 250/214 A |
| 2010/0289331 | A1 | 11/2010 | Shionoiri et al. |
| 2011/0121778 | A1 | 5/2011 | Oyobe et al. |
| 2011/0156494 | A1 | 6/2011 | Mashinsky |
| 2011/0193520 | A1 | 8/2011 | Yamazaki et al. |
| 2012/0032525 | A1 | 2/2012 | Oyobe et al. |
| 2015/0028807 | A1 | 1/2015 | Mashinsky |
| 2015/0035484 | A1 | 2/2015 | Mashinsky |
| 2015/0328998 | A1 | 11/2015 | Mashinsky et al. |
| 2017/0136899 | A1 | 5/2017 | Mashinsky |
| 2017/0243304 | A1 | 8/2017 | Mashinsky et al. |

FOREIGN PATENT DOCUMENTS

| | | |
|---|---|---|
| EP | 2 415 627 A2 | 2/2012 |
| EP | 2 584 665 A2 | 4/2013 |
| JP | 5-111168 | 4/1993 |
| JP | 8-237890 | 9/1996 |
| JP | 8-265986 | 10/1996 |
| JP | 9-102329 | 4/1997 |
| JP | 9-215211 | 8/1997 |
| JP | 10-304582 | 11/1998 |
| JP | 2000-092618 A | 3/2000 |
| JP | 2001-160122 A | 6/2001 |
| JP | 2001-250081 | 9/2001 |
| JP | 2004-229425 | 8/2004 |
| JP | 2005-210843 | 8/2004 |
| JP | 2005-110399 A | 4/2005 |
| JP | 2006-345588 A | 12/2006 |
| JP | 2007-282477 | 10/2007 |
| JP | 2008-137451 | 6/2008 |
| JP | 2008-206231 A | 9/2008 |
| JP | 2009-095072 A | 4/2009 |
| JP | 2009-106136 A | 5/2009 |
| JP | 2009-177921 A | 8/2009 |
| JP | 4356844 B2 | 11/2009 |
| JP | 2011-527884 | 11/2011 |
| JP | 2012-503959 | 2/2012 |
| WO | WO9933027 * | 7/1999 |
| WO | WO 2009/042214 A1 | 4/2009 |
| WO | WO 2010/006078 A1 | 1/2010 |
| WO | WO 2010/014634 A2 | 2/2010 |
| WO | WO 2010/024895 A1 | 3/2010 |

OTHER PUBLICATIONS

Chinese Office Action re Application No. CN 201110039854.7, dated May 19, 2015.

* cited by examiner transmission of test signal transmission of charging radio waves

MOVING OBJECT, WIRELESS POWER FEEDING SYSTEM, AND WIRELESS POWER FEEDING METHOD

BACKGROUND OF THE INVENTION

1. Field of the Invention

The present invention relates to a moving object which is driven by an electric motor and includes a secondary battery chargeable by wireless communication. The present invention also relates to a wireless power feeding system including a moving object and a power feeding device which supplies power to the moving object through wireless communication. The present invention further relates to a wireless communication method for use in the wireless power feeding system.

2. Description of the Related Art

In recent years, energy saving, creation and storage technologies are attracting more attention because environmental problems such as global warming are becoming more severe. In the case of a moving object with a secondary battery, i.e., a moving object which is driven by an electric motor using power provided from a secondary battery regardless of whether they have two wheels or four wheels, such as an electric car and a bicycle having a motor, energy storage techniques are used and in addition, an amount of carbon dioxide emissions can be reduced. Therefore, techniques used for such a moving object are particularly being developed actively.

At present, the secondary battery of the moving object can be charged by using a general home AC power source as a power feeding device or by using a public power feeding facility having a power feeding device such as a high-speed battery charger. In either case, a connector which makes electric connection by insertion of a plug into a socket is commonly used.

For charging of a secondary battery using such a connector, an electric connection between a moving object and a power feeding device is made by bringing a conductor of a plug into contact with a conductor of a socket. This requires cumbersome plugging-in/out operations for every charging, which may deteriorate the connector due to repeated charging operations. In addition, a large-sized moving object such as an electric car requires high power for charging. This may raise safety issues since damage from an electric shock or electric leakage due to moisture or the like may be significant. Accordingly, special care is needed for handling the connector.

In order to avoid the above problems associated with a connector, research and development are being conducted to propose a wireless power feeding system for supplying power from a power feeding device to a moving object by wireless communication (for example, see Patent Document 1). Use of such a wireless power feeding system allows a secondary battery to be charged without using any connector.

REFERENCE

[Patent Document 1] Japanese Published Patent Application No. 2004-229425

SUMMARY OF THE INVENTION

In the above-described wireless power feeding system, radio waves transmitted from an antenna of the power feeding device are received by an antenna of the moving object. The received radio waves are converted into electric energy, which is then stored in the secondary battery. The efficiency of converting energy of the radio waves into electric energy depends on the positional relationship between the antenna of the power feeding device and the antenna of the moving object. That is, misalignment between the positions of the antenna of the power feeding device and the antenna of the moving object leads to a low conversion efficiency, which results in inefficient charging of the secondary battery. However, it is difficult in most instances for an operator of the moving object to precisely recognize the positional relationship between the antenna of the moving object and the antenna of the power feeding device while driving the moving object, although it depends on where the antennas are installed.

In addition, in many cases, the antenna of the power feeding device outputs substantially constant high power radio waves. Thus, if the conversion efficiency for charging is low due to misalignment between the antennas, power may be dissipated and high power radio waves which have not been converted into electric energy may be radiated to the surroundings. Although it is known that irradiation of the radiated radio waves on a living body such as a human body causes no problem since most of the radiated radio waves is absorbed into the body and is changed into heat, an influence of radio waves on a living body has not yet been completely explained. Therefore, it is desirable to reduce the intensity of the radio waves radiated to the surroundings.

In consideration of the above problems, an object of the present invention is to provide a structure of a moving body which enables reduction of power loss caused when power is supplied from a power feeding device to a moving object by wireless communication. Another object of the present invention is to provide a structure of a moving body which enables reduction of the intensity of radio waves radiated to the surroundings.

Another object of the present invention is to provide a wireless power feeding system and a wireless power feeding method which enable reduction of power loss when power is supplied from a power feeding device to a moving object by wireless communication. Another object of the present invention is to provide a wireless power feeding system and a wireless power feeding method which enable reduction in intensity of radio waves radiated from a power feeding device to the surroundings during a charging operation.

In order to solve the above problems, in a first structure of the present invention, a moving object having a plurality of antennas receives radio waves transmitted from a power feeding device. At least one of the plurality of antennas is installed apart from the other antenna(s) of the moving object. Then, the radio waves transmitted from the power feeding device are received by the plurality of antennas and converted into electric energy.

Further, in the first structure of the present invention, before power is supplied to the moving object, radio waves for alignment of the moving object and the power feeding device are transmitted from the power feeding device. That is, radio waves are transmitted from the power feeding device in two stages. In a first stage, radio waves are transmitted to align the positions of the power feeding device and the moving object. In a second stage, radio waves are transmitted to supply power from the power feeding device to the moving object.

When the radio waves in the first stage are transmitted from the power feeding device, the moving object receives the radio waves and converts them into electric signals. The intensities of the electric signals contain data on the positional relationships in distance, direction or the like between an antenna of the power feeding device and the antennas of the moving object. Thus, the electric signals are used to detect the positional relationships between the antennas. Accordingly, the positional relationship between the moving object and the power feeding device can be modified so that power can be supplied efficiently from the power feeding device to the moving object.

In addition, the radio waves which are output in the first stage may have intensity enough for detection of the positional relationships between the antenna of the power feeding device and the antennas of the moving object. Accordingly, the intensity of the radio waves which are output in the first stage can be lower than the intensity of the radio waves for supply of power into the moving object, which is output in the second stage.

Alternatively, in order to solve the above problems, in a second structure of the present invention, radio waves transmitted from a power feeding device are received by one or more selected from a plurality of antennas of a moving object and converted into electric energy. At least one of the plurality of antennas is installed apart from the other antenna(s) of the moving object.

Further, in the second structure, before power is supplied to the moving object, radio waves are transmitted from the power feeding device to determine which of the plurality of antennas can receive the radio waves efficiently. That is to say, radio waves are transmitted from the power feeding device in two stages, also in this case. The radio waves in the first stage are transmitted to select one or more of the antennas. The radio waves in the second stage are transmitted to supply power from the power feeding device to the moving object.

When the radio waves in the first stage are transmitted from the power feeding device, the moving object receives the radio waves sequentially with the plurality of antennas and converts the radio waves into electric signals. Higher intensity of the electric signal means that the radio waves can be received more efficiently. Thus, with the electric signals, the antenna(s) can be selected so that power can be supplied efficiently from the power feeding device to the moving object.

Note that the radio waves output in the first stage may have intensity enough for selection of the antenna(s). Accordingly, the intensity of the radio waves output in the first stage can be lower than that of the radio waves for supply of power into the moving object, which is output in the second stage.

Alternatively, in order to solve the above problems, in a third structure of the present invention, a moving object receives radio waves transmitted from a power feeding device having a plurality of antennas. At least one of the plurality of antennas is installed apart from the other antenna(s) of the power feeding device. Then, one or more of the plurality of antennas are selected and the radio waves are transmitted from the selected antenna(s) of the power feeding device. The moving object receives the radio waves and converts them into electric energy.

In the case where one or more of the plurality of antennas of the power feeding device are selected to transmit radio waves from the selected antenna(s) of the power feeding device, before power is supplied to the moving object, radio waves are transmitted from the power feeding device sequentially using the plurality of antennas to determine which of the plurality of antennas can supply the radio waves most efficiently. That is to say, the radio waves are transmitted from the power feeding device in two stages.

The radio waves in the first stage are transmitted to select one or more of the antennas. The radio waves in the second stage are transmitted to supply power from the power feeding device to the moving object.

When the radio waves in the first stage are transmitted from the power feeding device, the moving object receives the radio waves and converts them into electric signals. Higher intensity of the electric signal means that the radio waves can be supplied more efficiently. Thus, with the electric signals, the antenna(s) can be selected so that power can be supplied efficiently from the power feeding device to the moving object.

Note that the radio waves output in the first stage may have intensity enough for selection of the antenna. Accordingly, the intensity of the radio waves output in the first stage can be lower than the intensity of the radio waves for supply of power into the moving object, which is output in the second stage.

In the second structure and the third structure, the antenna(s) of the moving object/the power feeding device is (are) selected by connection of the antenna (antennas) and a feeder line (feeder lines). In other words, the antenna(s) can be selected by connecting the antenna(s) and the feeder line(s). Each of the antennas has a pair of feeding points and the state where the antenna is connected to the feeder lines means that the pair of respective feeding points is connected to the pair of respective feeder lines.

As used herein, the term "moving object" means something driven by an electric motor using power stored in a secondary battery and includes, for example, automobiles (automatic two-wheeled cars, three or more-wheeled automobiles), motorized bicycles including a motor-assisted bicycle, aircrafts, boats, and railroad cars.

In addition, an operator of the moving object or a manager of operation of the power feeding device may manually determine whether to start charging the secondary battery based on the intensities of first electric signals obtained by reception of first radio waves. Alternatively, the signal processing circuit of the moving object may determine whether to start charging of the secondary battery and transmit a result of the determination, as radio waves signal, to the power feeding device. Alternatively, the data on the intensities of the first electric signals may be, as it is, transmitted, as a radio wave signal, from the moving object to the power feeding device in which it may be then determined whether to start the charging of the secondary battery.

The present invention can solve one of the problems by using at least one of the first to third structures.

According to an embodiment of the present invention, specifically, a moving object includes a plurality of antennas for generating first electric signals and second electric signals from first radio waves and second radio waves sequentially transmitted from a power feeding device, respectively; a signal processing circuit for extracting data on the positional relationship between the power feeding device and the moving object with the use of the first electric signals; a secondary battery for storing electric energy with the use of the second electric signals; and an electric motor to which the electric energy is supplied from the secondary battery.

According to another embodiment of the present invention, a moving object includes a plurality of antennas for generating first electric signals and a second electric signal from first radio waves and second radio waves sequentially transmitted from a power feeding device, respectively; a signal processing circuit for comparing intensities of the first electric signals; a selection circuit for selecting an antenna from the plurality of antennas based on the intensities of the first electric signals; a secondary battery for storing electric energy with the use of the second electric signal generated by the antenna selected from the plurality of antennas by the selection circuit; and an electric motor to which the electric energy is supplied from the secondary battery.

According to another embodiment of the present invention, specifically, a wireless power feeding system includes a moving object and a power feeding device having a first antenna. The moving object includes a plurality of second antennas for generating first electric signals and a second electric signal from first radio waves and second radio waves sequentially transmitted from the first antenna, respectively; a signal processing circuit for comparing intensities of the first electric signals; a selection circuit for selecting a second antenna from the plurality of second antennas based on the intensities of the first electric signals; a secondary battery for storing electric energy with the use of the second electric signal generated by the second antenna selected from the plurality of second antennas by the selection circuit; and an electric motor to which the electric energy is supplied from the secondary battery.

According to another embodiment of the present invention, specifically, a wireless power feeding system includes a power feeding device and a moving object. The power feeding device includes a plurality of first antennas for transmitting first radio waves and a selection circuit for selecting a first antenna from the plurality of first antennas. Second radio waves are transmitted from the first antenna selected from the plurality of first antennas by the selection circuit. The moving object includes a second antenna for generating first electric signals and a second electric signal from the first radio waves and the second radio waves, respectively; a signal processing circuit for comparing intensities of the first electric signals; a secondary battery for storing electric energy with the use of the second electric signal; and an electric motor to which the electric energy is supplied from the secondary battery. The first antenna is selected from the plurality of first antennas by the selection circuit based on the intensities of the first electric signals.

According to another embodiment of the present invention, specifically, a wireless power feeding method is as follows: first electric signals are generated by a plurality of antennas of a moving object from first radio waves transmitted from a power feeding device; the positional relationship between the power feeding device and the moving object is modified based on the intensities of the first electric signals; second electric signals are generated by the plurality of antennas from second radio waves transmitted from the power feeding device; with the use of the second electric signals, electric energy is stored in a secondary battery; and the electric energy stored in the secondary battery is supplied to an electric motor.

According to another embodiment of the present invention, specifically, a wireless power feeding method is as follows: first electric signals are generated by a plurality of antennas of a moving object from first radio waves transmitted from a power feeding device; an antenna is selected from the plurality of antennas based on the intensities of the first electric signals; a second electric signal is generated by the selected antenna from second radio waves transmitted from the power feeding device; with the use of the second electric signal, electric energy is stored in a secondary battery; and the electric energy stored in the secondary battery is supplied to an electric motor.

According to another embodiment of the present invention, specifically, a wireless power feeding method is as follows: first radio waves are transmitted from a plurality of first antennas of a power feeding device; first electric signals are generated from the first radio waves by a second antenna of a moving object; a first antenna is selected from the plurality of first antennas based on the intensities of the first electric signals; a second electric signal is generated by the second antenna from second radio waves transmitted from the selected first antenna; with the use of the second electric signal, electric energy is stored in a secondary battery; and the electric energy stored in the secondary battery is supplied to an electric motor.

According to one embodiment of the present invention, power can be supplied efficiently from the power feeding device to the moving object, which may result in reduction of power loss caused when the battery is charged. In addition, it is possible to reduce the intensity of radio waves radiated to the surroundings from the power feeding device without being used for charging.

DETAILED DESCRIPTION OF THE INVENTION

Hereinafter, embodiments of the present invention will be described in detail with reference to the accompanying drawings. However, it should be understood to those skilled in the art that the present invention is not limited to the following description and various modifications and changes may be made without departing from the spirit and scope of the invention. Therefore, the present invention should not be construed as being limited to the disclosed embodiments.

Embodiment 1

Figure 1:
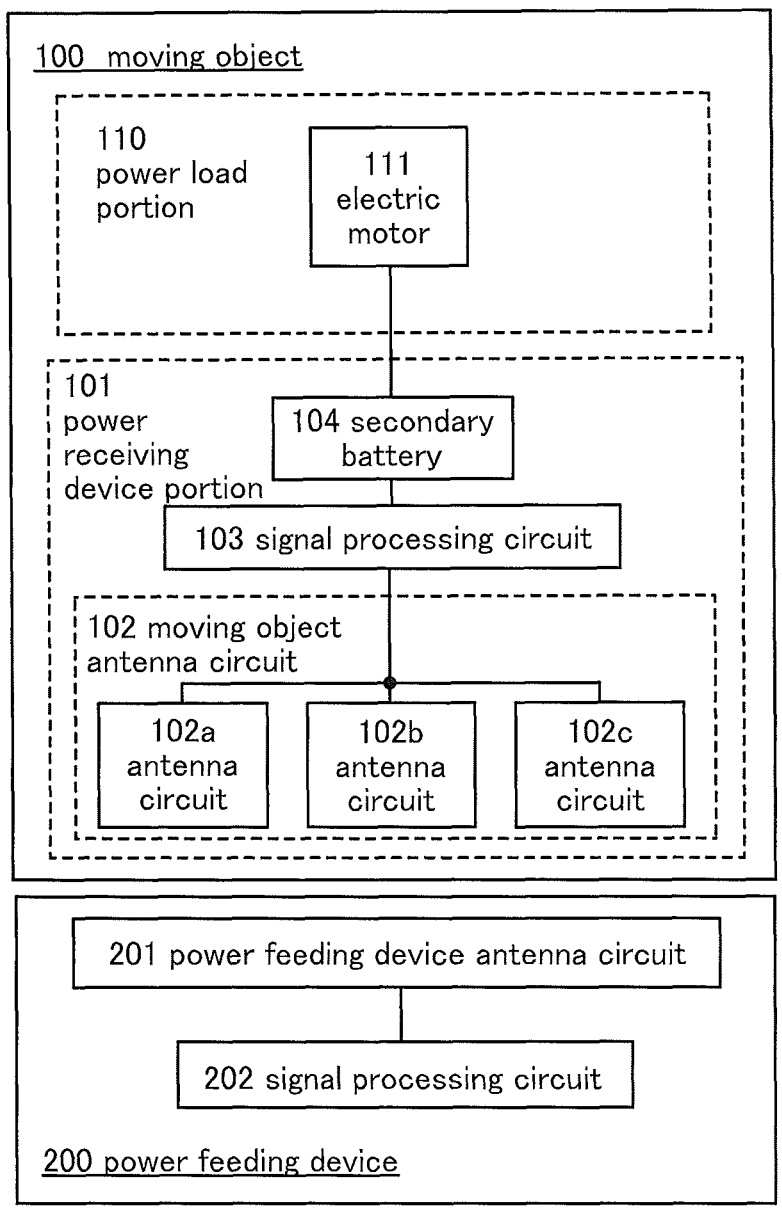
FIG. 1 is a view illustrating a structure of a wireless power feeding system including a moving object and a power feeding device.

A structure of a moving object and a wireless power feeding system using the moving object and a power feeding device according to the first structure of the present invention are shown in a block diagram of FIG. 1 by way of an example. Although the block diagram shows separate elements within the moving object or the power feeding device according to their functions, as independent blocks, it may be practically difficult to completely separate the elements according to their functions and, in some cases, one element may involve a plurality of functions.

As shown in FIG. 1, a moving object 100 includes a power receiving device portion 101 and a power load portion 110. The power receiving device portion 101 includes at least a plurality of moving object antenna circuits of a moving object antenna circuit 102, a signal processing circuit 103, and a secondary battery 104. The power load portion 110 includes at least an electric motor 111. There is no particular limitation on the number of the moving object antenna circuits of the moving object antenna circuit 102 as long as it is plural. FIG. 1 illustrates the case where the moving object antenna circuit 102 includes moving object antenna circuits 102a to 102c, as an example.

At least one of the plurality of moving object antenna circuits of the moving object antenna circuit 102 is installed apart from the other moving object antenna circuit(s) of the moving object 100. Alternatively, all of the moving object antenna circuits of the moving object antenna circuit 102 of the moving object 100 may be installed apart from each other.

In addition, the secondary battery 104 is a charge storage means. Examples of the charge storage means include a lead-acid battery, a nickel-cadmium battery, a nickel-hydride battery, and a lithium-ion battery.

In addition, a power feeding device 200 includes a power feeding device antenna circuit 201 and a signal processing circuit 202. The signal processing circuit 202 controls operation of the power feeding device antenna circuit 201. That is, the signal processing circuit 202 can control the intensity, the frequency, or the like of radio waves transmitted from the power feeding device antenna circuit 201.

The power feeding device 200 transmits alignment radio waves as a test signal from the power feeding device antenna circuit 201 in order to align the moving object 100 and the power feeding device 200 before supplying power to the moving object 100. The moving object 100 receives the test signal in any or all of the moving object antenna circuits 102a to 102c, converts it into an electric signal (electric signals), and then transmits the electric signal(s) to the signal processing circuit 103.

The intensity of the test signal depends on the positional relationship in distance, direction, or the like between the power feeding device antenna circuit 201 and the moving object antenna circuits 102a to 102c. The radio waves transmitted as the test signal are most likely to be received by the moving object antenna circuit of the moving object antenna circuit 102 which is closest to and has substantially the same direction as the power feeding device antenna circuit 201 and the intensity of the test signal as an obtained electric signal is high, unless an obstruction exists between the moving object antenna circuit of the moving object antenna circuit 102 and the power feeding device antenna circuit 201.

The signal processing circuit 103 extracts data on the positional relationship(s) between the power feeding device antenna circuit 201 and the moving object antenna circuits 102a to 102c from the intensity (intensities) of the received test signal.

If the intensity of the received test signal is sufficiently high, it means that efficiency of energy conversion in converting the radio waves into the electric signal is sufficiently high. Accordingly, the positional relationship between the power feeding device antenna circuit 201 and any of the moving object antenna circuits 102a to 102c is determined to be in a state adapted to start charging.

If the intensity of the received test signal is insufficient, it means that efficiency of energy conversion in converting the radio waves into the electric signal is low. Accordingly, the positional relationship(s) between the power feeding device antenna circuit 201 and the moving object antenna circuits 102a to 102c is determined to be not in a state adapted to start charging.

The criterion for determining whether or not the positional relationship between the moving object antenna circuit 102 and the power feeding device antenna circuit 201 is in a state adapted to start charging may be properly set by a designer.

In addition, an operator of the moving object 100 or a person who manages operation of the power feeding device 200 may manually determine whether to start charging of the secondary battery 104 based on data on the positional relationship(s) extracted by the signal processing circuit 103.

The charging of the secondary battery 104 is performed by transmitting charging radio waves from the power feeding device antenna circuit 201 of the power feeding device 200. The moving object 100 receives the charging radio waves in the moving object antenna circuit 102, converts them into an electric signal, and then transmits the electric signal to the signal processing circuit 103. Then, the electric signal is transmitted from the signal processing circuit 103 to the secondary battery 104 in which the electric signal is stored as electric energy.

The electric motor 111 drives the moving object 100 by converting the electric energy stored in the secondary battery 104 into mechanical energy.

If the intensity of the test signal is insufficient so that the charging cannot be started, the positional relationship between the power feeding device antenna circuit 201 and the moving object antenna circuits 102a to 102c is modified by changing the position or direction of the moving object 100 or the power feeding device 200. Alternatively, the positional relationship may be modified by directly changing the position(s) or direction(s) of the moving object antenna circuits 102a to 102c or the power feeding device antenna circuit 201 with the moving object 100 or the power feeding device 200 fixed at a certain position. After modifying the positional relationship, another test signal is used to redetermine whether or not the positional relationship between the power feeding device antenna circuit 201 and any of the moving object antenna circuits 102a to 102c is in a state adapted to start the charging.

The intensity of the radio waves transmitted as the test signal may be sufficient as long as the positional relationship between the moving object antenna circuit 102 and the power feeding device antenna circuit 201 can be detected. Thus, the intensity of the radio waves can be sufficiently lower than that of the charging radio waves.

If test signals are transmitted plural times for the alignment, the intensities of the test signals to be transmitted are not necessarily be equal to each other. For example, the intensities of test signals transmitted plural times for alignment may be gradually lowered. Alternatively, if the positional relationships between the power feeding device antenna circuit 201 and the moving object antenna circuits 102a to 102c are unfavorable so that a test signal transmitted first cannot be received, a test signal with an intensity higher than that of the first test signal may be transmitted next.

In one embodiment of the present invention, there is no limitation on the frequency of the charging radio waves and the charging radio waves may have any frequency band as long as power can be transmitted. For example, the charging radio waves may have any of an LF band of 135 kHz (long wave), a HF band of 13.56 MHz, a UHF band of 900 MHz to 1 GHz, and a microwave band of 2.45 GHz.

In addition, the radio waves used as the test signal may have the same frequency band as the charging radio waves or a frequency band different from that of the charging radio waves.

A transmission method of radio waves may be properly selected from various methods including an electromagnetic coupling method, an electromagnetic induction method, a resonance method, and a microwave method. In one embodiment of the present invention, in order to prevent energy loss due to foreign substances containing moisture, such as rain and mud, the electromagnetic induction method or the resonance method using a low frequency band, more specifically, frequencies of a short wave of 3 MHz to 30 MHz, a medium wave of 300 kHz to 3 MHz, a long wave of 30 kHz to 300 kHz, or a very-low frequency wave of 3 kHz to 30 kHz, may be used.

In the first structure of the present invention, the moving object 100 has the plurality of moving object antenna circuits of the moving object antenna circuit 102. When at least one of the plurality of moving object antenna circuits of the moving object antenna circuit 102 is placed so as to receive radio waves transmitted from the power feeding device 200, power can be supplied to the moving object 100 efficiently. Thus, compared to the case where the moving object has one moving object antenna circuit 102, tolerance of misalignment between the moving object 100 and the power feeding device 200 in charging can be great and data on the positional relationship can be obtained and the positional relationship can be modified easily.

In the first structure of the present invention, the data on the positional relationship between the moving object antenna circuit 102 and the power feeding device antenna circuit 201 may be extracted from the intensity of the test signal. The data on the positional relationship helps the operator of the moving object 100 to align the moving object 100 and the power feeding device 200 while driving the moving object 100. Alternatively, this data helps the manager of operation of the power feeding device 200 to align the moving object 100 and the power feeding device 200 while operating the power feeding device 200. Accordingly, the moving object 100 and the power feeding device 200 can be easily aligned to prevent power loss caused when the battery is charged. In addition, the intensity of radio waves radiated to the surroundings from the power feeding device 200 without being used for charging can be low.

Embodiment 2

Figure 2:
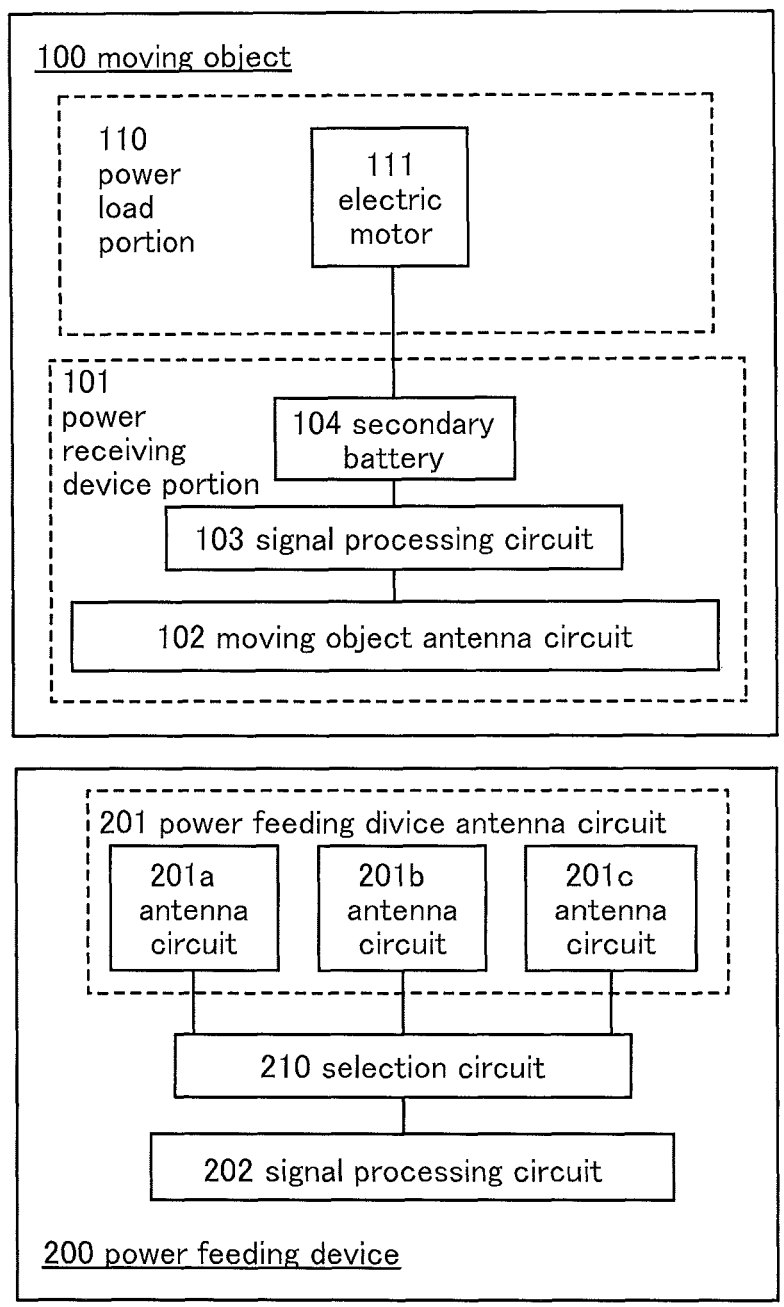
FIG. 2 is a view illustrating a structure of a wireless power feeding system including a moving object and a power feeding device.

A structure of a moving object and a wireless power feeding system using the moving object and a power feeding device according to the third structure of the present invention are shown in a block diagram of FIG. 2 by way of an example.

In FIG. 2, the moving object 100 includes the power receiving device portion 101 and the power load portion 110 as in FIG. 1. The power receiving device portion 101 includes at least the moving object antenna circuit 102, the signal processing circuit 103, and the secondary battery 104. The power load portion 110 includes at least the electric motor 111.

FIG. 2 illustrates the case where the moving object antenna circuit 102 has one moving object antenna circuit, as an example; however, it may have a plurality of moving object antenna circuits as in FIG. 1.

In addition, the power feeding device 200 includes a plurality of power feeding device antenna circuits of the power feeding device antenna circuit 201, the signal processing circuit 202, and a selection circuit 210. There is no particular limitation on the number of the power feeding device antenna circuits of the power feeding device antenna circuit 201 as long as it is plural. FIG. 2 illustrates the case where the power feeding device antenna circuit 201 includes power feeding device antenna circuits 201a to 201c, as an example.

At least one of the plurality of power feeding device antenna circuits of the power feeding device antenna circuit 201 is installed apart from the other power feeding device antenna circuit(s) of the power feeding device 200. Alternatively, all of the power feeding device antenna circuits of the power feeding device antenna circuit 201 of the power feeding device 200 may be installed apart from each other.

The selection circuit 210 can select at least one of the plurality of power feeding device antenna circuits of the power feeding device antenna circuit 201. Specifically, selection of the power feeding device antenna circuit 201 of the power feeding device 200 is performed by connection of a feeder line (feeder lines) and the power feeding device antenna circuit(s) of the power feeding device antenna circuit 201. In other words, the power feeding device antenna circuit(s) of the power feeding device antenna circuit 201 can be selected by connecting the feeder line(s) and the power feeding device antenna circuit(s) of the power feeding device antenna circuit 201. Each of the power feeding device antenna circuits of the power feeding device antenna circuit 201 has a pair of feeding points and the state where the power feeding device antenna circuit 201 is connected to the feeder lines means that the pair of respective feeding points is connected to the pair of respective feeder lines.

The signal processing circuit 202 controls operation(s) of the selected power feeding device antenna circuit(s) of the power feeding device antenna circuit 201. That is, the signal processing circuit 202 can control the intensity, the frequency, or the like of radio waves transmitted from the selected power feeding device antenna circuit(s) of the power feeding device antenna circuit 201.

The power feeding device 200 transmits radio waves as a test signal to determine which of the plurality of power feeding device antenna circuits of the power feeding device antenna circuit 201 can supply the radio waves to the moving object 100 efficiently. The moving object 100 receives the test signal in the moving object antenna circuit 102, converts them into an electric signal, and then transmits the electric signal to the signal processing circuit 103.

The intensity of the test signal depends on the positional relationship in distance, direction, or the like between the moving object antenna circuit 102 and the power feeding device antenna circuits 201a to 201c. The moving object antenna circuit 102 can receive most efficiently the test signal transmitted from the power feeding device antenna circuit of the power feeding device antenna circuit 201 which is closest to and has substantially the same direction as the moving object antenna circuit 102, unless an obstruction exists between the moving object antenna circuit 102 and the power feeding device antenna circuit of the power feeding device antenna circuit 201.

The signal processing circuit 103 extracts data on the positional relationship between the moving object antenna circuit 102 and the power feeding device antenna circuits 201a to 201c from the intensity of the received test signal.

If the intensity of the received test signal is sufficiently high, it means that efficiency of energy conversion in converting the radio waves into the electric signal is sufficiently high. Thus, which of the plurality of power feeding device antenna circuits of the power feeding device antenna circuit 201 should be selected to realize the state adapted to start of charging is determined based on the intensity of the received test signal.

If all of the intensities of the received test signal are insufficient, it means that efficiency of energy conversion in converting the radio waves into the electric signal is low, no matter which of the power feeding device antenna circuits of the power feeding device antenna circuit 201 is used. Accordingly, the positional relationships between the moving object antenna circuit 102 and the power feeding device antenna circuits 201a to 201c are determined to be not in a state adapted to start charging. In that case, as in the case of Embodiment 1, after modifying the positional relationships between the moving object antenna circuit 102 and the power feeding device antenna circuits 201a to 201c, another test signal may be transmitted to redetermine whether or not the positional relationship between the moving object antenna circuit 102 and any of the power feeding device antenna circuits 201a to 201c is in a state adapted to start the charging.

In addition, an operator of the moving object 100 or a person who manages operation of the power feeding device 200 may manually determine whether to start charging of the secondary battery 104 based on data on the intensity of the test signal extracted by the signal processing circuit 103. The criterion for determining whether or not the state is adapted to start of charging can be properly set by a designer.

The charging of the secondary battery 104 is performed by transmitting charging radio waves from the power feeding device antenna circuit 201 which has been selected based on data on the intensity of the test signal. The moving object 100 receives the charging radio waves in the moving object antenna circuit 102, converts them into an electric signal, and then transmits the electric signal to the signal processing circuit 103. Then, the electric signal is transmitted from the signal processing circuit 103 to the secondary battery 104 in which the electric signal is stored as electric energy.

The electric motor 111 drives the moving object 100 by converting the electric energy stored in the secondary battery 104 into mechanical energy.

The intensity of the radio waves transmitted as the test signal may be sufficient as long as selection from the power feeding device antenna circuits of the power feeding device antenna circuit 201 can be performed. Thus, the intensity of the radio waves can be sufficiently lower than that of the charging radio waves.

In the third structure of the present invention, there is no limitation on the frequency of the charging radio waves and the charging radio waves may have any frequency band as long as power can be transmitted, as in the first structure described in Embodiment 1.

In addition, the radio waves used as the test signal may have the same frequency band as the charging radio waves or a frequency band different from that of the charging radio waves as in the first structure described in Embodiment 1.

As in the first structure described in Embodiment 1, a transmission method of radio waves may be selected appropriately.

In the third structure of the present invention, the power feeding device 200 has the plurality of power feeding device antenna circuits of the power feeding device antenna circuit 201. When the moving object 100 is placed so as to receive radio waves transmitted from at least one of the power feeding device antenna circuits of the power feeding device antenna circuit 201, power can be supplied to the moving object 100 efficiently. Thus, compared to the case where the power feeding device has one power feeding device antenna circuit 201, tolerance of misalignment between the moving object 100 and the power feeding device 200 in charging can be great. Accordingly, the moving object 100 and the power feeding device 200 can be easily aligned to prevent power loss caused when the battery is charged. In addition, the intensity of radio waves radiated to the surroundings from the power feeding device 200 without being used for charging can be low.

This embodiment can be implemented in appropriate combination with any of the other embodiments.

Embodiment 3

Figure 3:
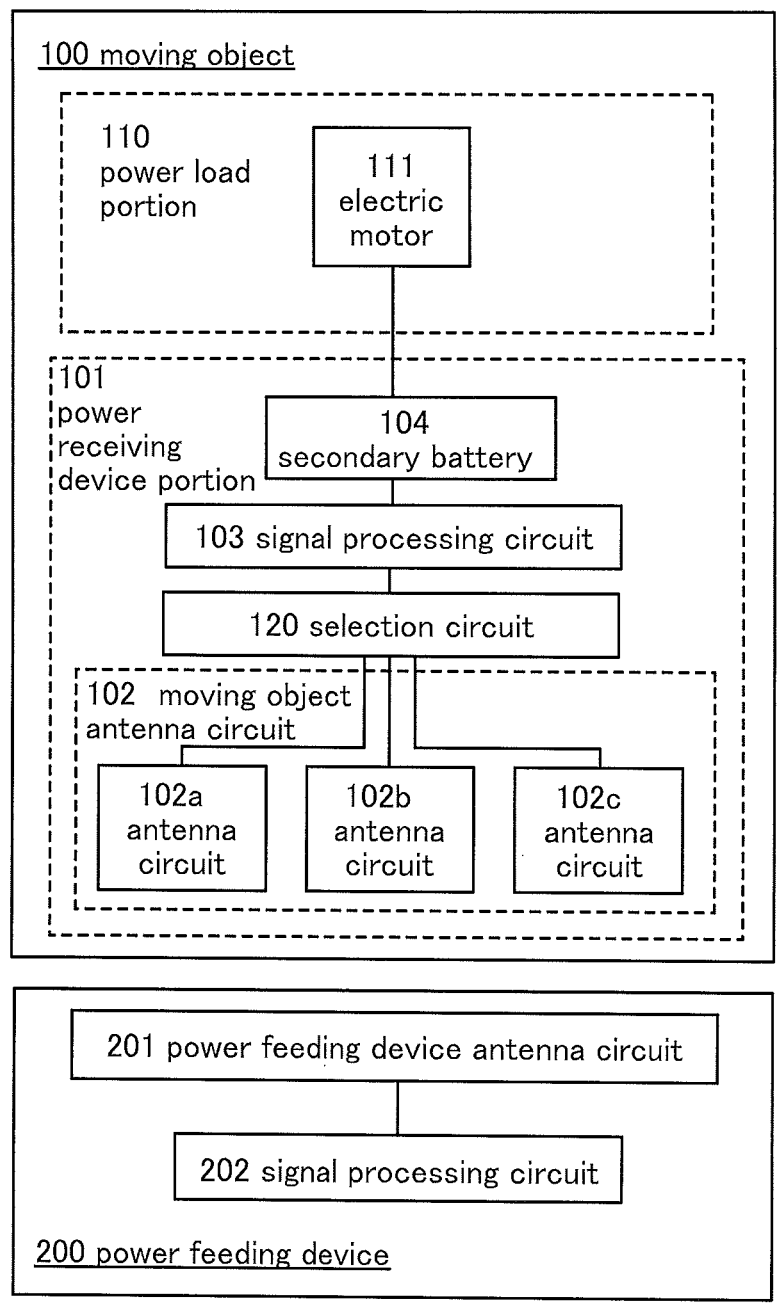
FIG. 3 is a view illustrating a structure of a wireless power feeding system including a moving object and a power feeding device.

A structure of a moving object and a wireless power feeding system using the moving object and a power feeding device according to the second structure of the present invention are shown in a block diagram of FIG. 3 by way of an example.

In FIG. 3, the moving object 100 includes the power receiving device portion 101 and the power load portion 110 as in FIG. 1. The power receiving device portion 101 includes at least a plurality of moving object antenna circuits of the moving object antenna circuit 102, the signal processing circuit 103, the secondary battery 104, and a selection circuit 120. The power load portion 110 includes at least the electric motor 111.

There is no particular limitation on the number of the moving object antenna circuits of the moving object antenna circuit 102 as long as it is plural. FIG. 3 illustrates the case where the moving object antenna circuit 102 includes moving the object antenna circuits 102a to 102c, as an example. At least one of the plurality of moving object antenna circuits of the moving object antenna circuit 102 is installed apart from the other moving object antenna circuit(s) of the moving object 100. Alternatively, all of the moving object antenna circuits of the moving object antenna circuit 102 of the moving object 100 may be installed apart from each other.

The selection circuit 120 can select at least one of the plurality of moving object antenna circuits of the moving object antenna circuit 102. Specifically, selection of the moving object antenna circuit(s) 102 of the moving object 100 is performed by connection of a feeder line (feeder lines) and the moving object antenna circuit(s) of the moving object antenna circuit 102. In other words, the moving object antenna circuit(s) of the moving object antenna circuit 102 can be selected by connecting the feeder line(s) and the moving object antenna circuit(s) of the moving object antenna circuit 102. Each of the moving object antenna circuits of the moving object antenna circuit 102 has a pair of feeding points and the state where the moving object antenna circuit 102 is connected to the feeder lines means that the pair of respective feeding points is connected to the pair of respective feeder lines.

In addition, the power feeding device 200 includes the power feeding device antenna circuit 201 and the signal processing circuit 202. The signal processing circuit 202 controls operation of the power feeding device antenna circuit 201. That is, the signal processing circuit 202 can control the intensity, the frequency, or the like of radio waves transmitted from the power feeding device antenna circuit 201.

FIG. 3 illustrates the case where the power feeding device antenna circuit 201 has one power feeding device antenna circuit, as an example; however, it may have a plurality of power feeding device antenna circuits as in FIG. 2. Note that in the case where the power feeding device antenna circuit 201 has a plurality of power feeding device antenna circuits, the selection circuit 210 for selecting the power feeding device antenna circuit(s) of the power feeding device antenna circuit 201 is provided in the power feeding device 200 as in FIG. 2.

The power feeding device 200 transmits radio waves as a test signal to determine which of the plurality of moving object antenna circuits of the moving object antenna circuit 102 should be selected for efficient supply of the radio waves to the moving object 100 before power is supplied to the moving object 100. The moving object 100 receives the test signal sequentially in the plurality of moving object antenna circuits of the moving object antenna circuit 102, converts them into electric signals, and then transmits the electric signals to the signal processing circuit 103.

The intensity of the test signal depends on the positional relationship in distance, direction, or the like between the power feeding device antenna circuit 201 and the moving object antenna circuits 102a to 102c. The radio waves transmitted as the test signal are received by the moving object antenna circuit of the moving object antenna circuit 102 which is closest to and has substantially the same direction as the power feeding device antenna circuit 201, unless an obstruction exists between the power feeding device antenna circuit 201 and the moving object antenna circuit of the moving object antenna circuit 102.

The signal processing circuit 103 extracts data on the positional relationships between the power feeding device antenna circuit 201 and the moving object antenna circuits 102a to 102c from the intensities of the received test signal.

If the intensity of the received test signal is sufficiently high, it means that efficiency of energy conversion in converting the radio waves into the electric signal is sufficiently high. Thus, which of the moving object antenna circuits of the moving object antenna circuit 102 should be selected to realize the state adapted to start of charging is determined based on the intensities of the received test signal.

If all of the intensities of the received test signal are insufficient, it means that efficiency of energy conversion in converting the radio waves into the electric signal is low, no matter which of the moving object antenna circuits of the moving object antenna circuit 102 is used. Accordingly, the positional relationships between the power feeding device antenna circuit 201 and the moving object antenna circuits of the moving object antenna circuit 102 are determined to be not in a state adapted to start charging. In that case, as in the case of Embodiment 1, after modifying the positional relationships between the power feeding device antenna circuit 201 and the moving object antenna circuits of the moving object antenna circuit 102, another test signal may be transmitted to redetermine whether or not the positional relationship between the power feeding device antenna circuit 201 and any of the moving object antenna circuits of the moving object antenna circuit 102 is in a state adapted to start the charging.

In addition, an operator of the moving object 100 or a person who manages operation of the power feeding device 200 may manually determine whether to start charging of the secondary battery 104 based on data on the intensities of the test signal extracted by the signal processing circuit 103. The criterion for determining whether or not the state is adapted to start of charging can be properly set by a designer.

The charging of the secondary battery 104 is performed by transmitting charging radio waves from the power feeding device antenna circuit 201. The moving object 100 receives the charging radio waves in the moving object antenna circuit 102 which has been selected by the selection circuit 120 based on data on the intensities of the test signal, converts them into an electric signal (electric signals), and then transmits the electric signal(s) to the signal processing circuit 103. Then, the electric signal(s) is (are) transmitted from the signal processing circuit 103 to the secondary battery 104 in which the electric signal(s) is (are) stored as electric energy.

The electric motor 111 drives the moving object 100 by converting the electric energy stored in the secondary battery 104 into mechanical energy.

The intensity of the radio waves transmitted as the test signal may be sufficient as long as selection from the moving object antenna circuits of the moving object antenna circuit 102 can be performed. Thus, the intensity of the radio waves can be sufficiently lower than that of the charging radio waves.

In the second structure of the present invention, there is no limitation on the frequency of the charging radio waves and the charging radio waves may have any frequency band as long as power can be transmitted, as in the first structure described in Embodiment 1.

In addition, the radio waves used as the test signal may have the same frequency band as the charging radio waves or a frequency band different from that of the charging radio waves as in the case of Embodiment 1.

In the second structure of the present invention, a transmission method of radio waves may be selected appropriately as in the first structure described in Embodiment 1.

In the second structure of the present invention, the moving object 100 has the plurality of moving object antenna circuits of the moving object antenna circuit 102. When at least one of the plurality of moving object antenna circuits of the moving object antenna circuit 102 is placed so as to receive radio waves transmitted from the power feeding device antenna circuit 201, power can be supplied to the moving object 100 efficiently. Thus, compared to the case where the moving object has one moving object antenna circuit 102, tolerance of misalignment between the moving object 100 and the power feeding device 200 in charging can be great. Accordingly, the moving object 100 and the power feeding device 200 can be easily aligned to prevent power loss caused when the battery is charged. In addition, the intensity of radio waves radiated to the surroundings from the power feeding device 200 without being used for charging can be low.

This embodiment can be implemented in appropriate combination with any of the other embodiments.

Embodiment 4

In this embodiment, a more specific structure of the moving object and the wireless power feeding system using the moving object and a power feeding device according to Embodiment 1 will be described.

Figure 4:
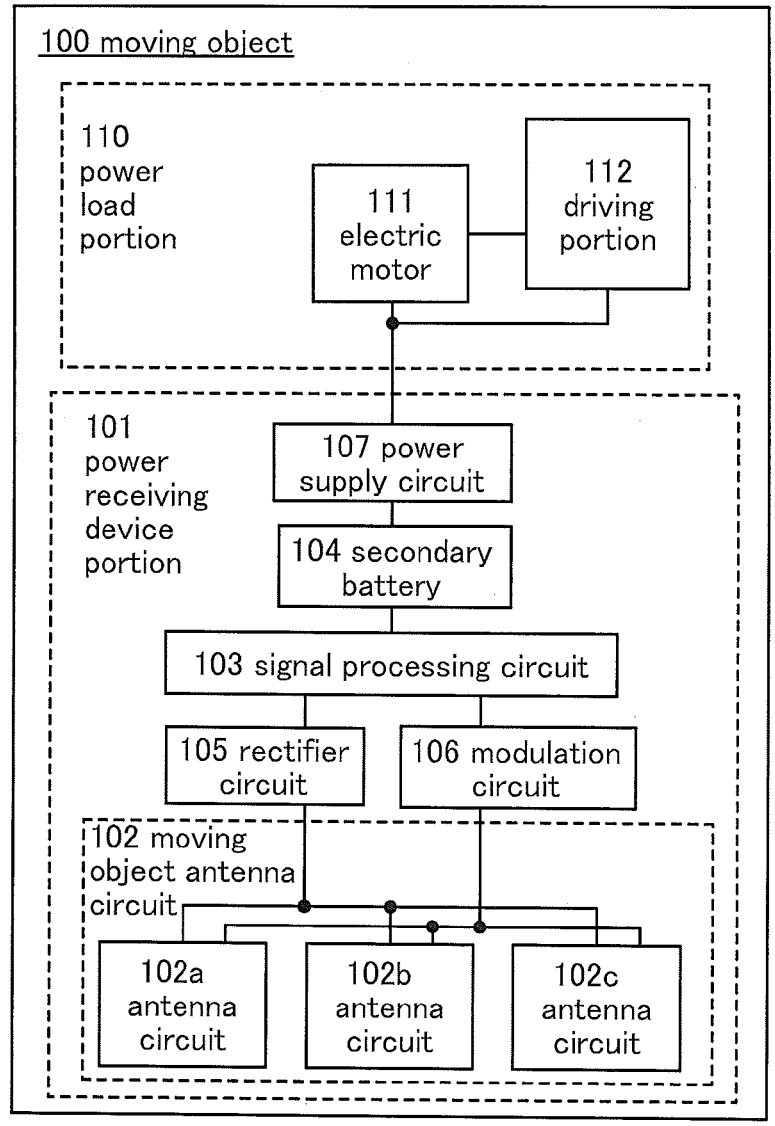
FIG. 4 is a view illustrating a structure of a wireless power feeding system including a moving object and a power feeding device.
Figure 4:
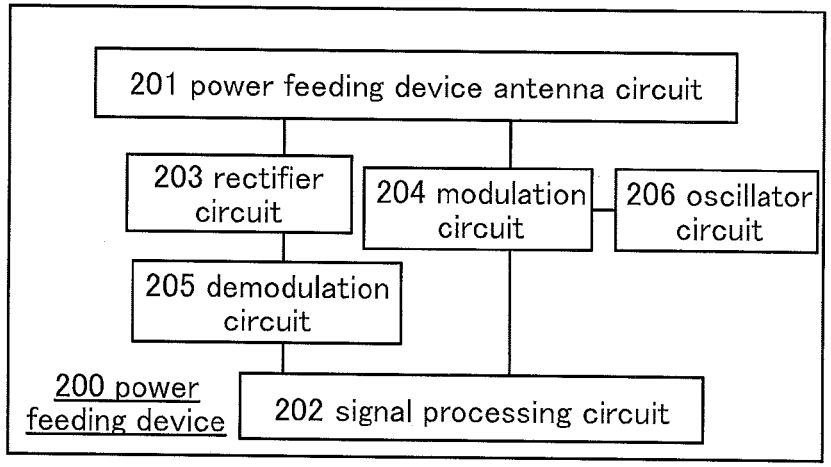

A structure of a moving object and a wireless power feeding system using the moving object and a power feeding device according to one embodiment of the present invention are shown in a block diagram of FIG. 4 by way of an example. In FIG. 4, the moving object 100 includes the power receiving device portion 101 and the power load portion 110 as in FIG. 1.

The power receiving device portion 101 includes at least a plurality of moving object antenna circuits of the moving object antenna circuit 102, the signal processing circuit 103, the secondary battery 104, a rectifier circuit 105, a modulation circuit 106, and a power supply circuit 107. The power load portion 110 includes at least the electric motor 111 and a driving portion 112 whose operation is controlled by the electric motor 111.

In addition, the power feeding device 200 includes at least the power feeding device antenna circuit 201, the signal processing circuit 202, a rectifier circuit 203, a modulation circuit 204, a demodulation circuit 205, and an oscillator circuit 206.

Note that in the block diagram of FIG. 4, a DC-DC converter and/or an overcharge control circuit for controlling operation of the power supply circuit 107 so as to prevent the secondary battery 104 from being overcharged may be provided appropriately.

Next, operations of the moving object 100 and the power feeding device 200 illustrated in FIG. 4 will be described with reference to a flow chart shown in FIG. 7. The operations of the moving object 100 and the power feeding device 200 illustrated in FIG. 4 may include a first stage of aligning the moving object 100 and the power feeding device 200 and a second stage of performing a charging operation, as will be described below.

First, in the first stage, alignment radio waves are transmitted as a test signal from the power feeding device antenna circuit 201 (A01: transmission of a test signal). Specifically, the signal processing circuit 202 generates a signal needed for alignment. The signal contains data on the intensity, the frequency, and the like of the radio waves. Then, the modulation circuit 204 applies a voltage to the power feeding device antenna circuit 201 in accordance with the signal and a signal with a certain frequency generated in the oscillator circuit 206, whereby the alignment radio waves are transmitted as the test signal from the power feeding device antenna circuit 201.

The test signal transmitted from the power feeding device antenna circuit 201 is received by the plurality of moving object antenna circuits of the moving object antenna circuit 102 of the moving object 100 (B01: reception of the test signal). The received test signal is converted into an electric signal in each of the plurality of moving object antenna circuits of the moving object antenna circuit 102, the electric signal is rectified in the rectifier circuit 105, and then the rectified electric signal is transmitted to the signal processing circuit 103.

The intensity of the received test signal depends on the positional relationship in distance, direction, or the like between the power feeding device antenna circuit 201 and the plurality of moving object antenna circuits of the moving object antenna circuit 102. The signal processing circuit 103 extracts data on the positional relationships between the power feeding device antenna circuit 201 and the plurality of moving object antenna circuits of the moving object antenna circuit 102 from the intensities of the received test signal transmitted from the rectifier circuit 105.

Then, the signal processing circuit 103 determines whether the positional relationship between the power feeding device antenna circuit 201 and any of the plurality of moving object antenna circuits of the moving object antenna circuit 102 is adapted to start of charging based on the intensities of the received test signal (B02: determination of whether the state is adapted to start of charging).

If the intensity of the received test signal is insufficient, it means that the efficiency of energy conversion in converting the radio waves into the electric signal is low. Accordingly, the positional relationships between the power feeding device antenna circuit 201 and the plurality of moving object antenna circuits of the moving object antenna circuit 102 are determined to be not in a state adapted to start of the charging. When such determination is made, the positional relationships between the power feeding device antenna circuit 201 and the plurality of moving object antenna circuits of the moving object antenna circuit 102 are modified by changing the position or direction of the moving object 100 or the power feeding device 200 (B03: modification of the positional relationships between antenna circuits). Alternatively, the positional relationships may be modified by directly changing the position or direction of the moving object antenna circuit 102 or the power feeding device antenna circuit 201 while the moving object 100 or the power feeding device 200 is fixed at a certain position. After the positional relationships are modified, the steps A01 (transmission of a test signal) to B02 (determination of whether the state is adapted to start of charging) are repeated to perform alignment.

If the intensity of the received test signal is sufficiently high, it means that efficiency of energy conversion in converting the radio waves into the electric signal is sufficiently high. Accordingly, the positional relationship between the power feeding device antenna circuit 201 and any of the plurality of moving object antenna circuits of the moving object antenna circuit 102 is determined to be in a state adapted to start of charging.

Determination that the state is adapted to start of charging means that alignment has been finished and preparation for charging has been completed. In that case, the signal processing circuit 103 generates a signal for notifying the power feeding device 200 of completion of preparation. Then, the modulation circuit 106 applies a voltage to the plurality of moving object antenna circuits of the moving object antenna circuit 102 in accordance with the signal, whereby the signal for notification of completion of preparation is transmitted from the plurality of moving object antenna circuits of the moving object antenna circuit 102 (B04: transmission of a signal for notification of completion of preparation).

Then, the signal for notification of completion of preparation is received by the power feeding device antenna circuit 201 of the power feeding device 200 (A02: reception of the signal for notification of completion of preparation). The received signal is converted into an electric signal in the power feeding device antenna circuit 201 and the electric signal is rectified in the rectifier circuit 203. The rectified signal is demodulated in the demodulation circuit 205 and then transmitted to the signal processing circuit 202. When the signal processing circuit 202 receives the signal for notification of completion of preparation, the operations of the moving object 100 and the power feeding device 200 shift from the first stage to the second stage.

In the second stage, charging radio waves are transmitted from the power feeding device antenna circuit 201 (A03: transmission of charging radio waves). Specifically, the signal processing circuit 202 generates a signal needed for charging. The signal contains data on the intensity, the frequency, and the like of the radio waves. Then, the modulation circuit 204 applies a voltage to the power feeding device antenna circuit 201 in accordance with the signal and a signal with a certain frequency generated in the oscillator circuit 206, whereby the charging radio waves are transmitted from the power feeding device antenna circuit 201.

The charging radio waves transmitted from the power feeding device antenna circuit 201 are received by the plurality of moving object antenna circuits of the moving object antenna circuit 102 of the moving object 100. The received charging radio waves are converted into an electric signal in each of the plurality of moving object antenna circuits of the moving object antenna circuit 102, the electric signal is rectified in the rectifier circuit 105, and then the rectified electric signal is transmitted to the signal processing circuit 103. After that, the electric signal is transmitted from the signal processing circuit 103 to the secondary battery 104 in which the electric signal is stored as electric energy.

After charging of the secondary battery 104 is completed (B05: completion of charging), the signal processing circuit 103 generates a signal for notifying the power feeding device 200 of completion of charging. Then, the modulation circuit 106 applies a voltage to the plurality of moving object antenna circuits of the moving object antenna circuit 102 in accordance with the signal, whereby the signal for notification of completion of charging is transmitted from the plurality of moving object antenna circuits of the moving object antenna circuit 102 (B06: transmission of a signal for notification of completion of charging).

Then, the signal for notification of completion of charging is received by the power feeding device antenna circuit 201 of the power feeding device 200 (A04: reception of the signal for notification of completion of charging). The received signal is converted into an electric signal in the power feeding device antenna circuit 201 and the electric signal is rectified in the rectifier circuit 203. The rectified signal is demodulated in the demodulation circuit 205 and then transmitted to the signal processing circuit 202. Receiving the signal for notification of completion of charging, the signal processing circuit 202 transmits a signal for stopping transmission of the radio waves to the oscillator circuit 206 and the modulation circuit 204 in order to stop the transmission of the charging radio waves (A05: termination of the transmission of the charging radio waves).

Electric energy stored in the secondary battery 104 is made to have a constant voltage in the power supply circuit 107 and supplied to the electric motor 111. The electric motor 111 converts the supplied electric energy into mechanical energy to actuate the driving portion 112.

In this embodiment, the signal processing circuit 103 in the moving object 100 determines whether charging of the secondary battery 104 should be started and the determination result is transmitted as a radio wave signal to the power feeding device 200; however, one embodiment of the present invention is not limited to that structure. For example, data on the positional relationship between the power feeding device 200 and the moving object 100 may be transmitted as a radio wave signal without any change from the moving object 100 to the power feeding device 200 in which it may be then determined whether to start the charging of the secondary battery 104. In that case, the positional relationship may be modified by moving the power feeding device 200. Alternatively, a signal for requesting modification of the positional relationship may be transmitted from the power feeding device 200 to the moving object 100 and the positional relationship may be modified by moving the moving object 100. Then, the step A03 (transmission of charging radio waves) may directly follow the step B02 (determination of whether the state is adapted to start of charging) because a signal for notification of completion of charging does not need to be transmitted from the moving object 100 to the power feeding device 200.

As a modulation method used by the modulation circuit 106 or the modulation circuit 204, any of a variety of methods such as amplitude modulation, frequency modulation, and phase modulation can be employed.

The modulation circuit 106 modulates carriers (carrier waves) transmitted from the power feeding device antenna circuit 201 by applying a voltage to the plurality of moving object antenna circuits of the moving object antenna circuit 102 in accordance with the signal for notification of completion of preparation or the signal for notification of completion of charging, whereby the signal is transmitted from the moving object 100 to the power feeding device 200. Alternatively, carriers (carrier waves) are not transmitted from the power feeding device antenna circuit 201, an oscillator circuit may be provided in the power receiving device portion 101 included in the moving object 100, and the modulation circuit 106 may apply a voltage to the plurality of moving object antenna circuits of the moving object antenna circuit 102 in accordance with the signal and a signal with a certain frequency generated in the oscillator circuit so that the signal is transmitted from the moving object 100 to the power feeding device 200.

Note that an oscillator circuit may be provided in the power receiving device portion 101 included in the moving object 100 and a start signal may be transmitted from the moving object 100 in the first step of the first stage in order to instruct the power feeding device 200 to transmit a test signal. In that case, the oscillator circuit may be electrically connected to the modulation circuit 106. After the signal processing circuit 103 generates the start signal containing data on the intensity, the frequency, and the like of the radio waves, the modulation circuit 106 applies a voltage to the moving object antenna circuits of the moving object antenna circuit 102 in accordance with the signal and a signal with a certain frequency generated in the oscillator circuit, whereby the start signal is transmitted from the moving object antenna circuits of the moving object antenna circuit 102 by radio waves.

Then, the start signal is received by the power feeding device antenna circuit 201 of the power feeding device 200. The received signal is converted into an electric signal in the power feeding device antenna circuit 201 and the electric signal is rectified in the rectifier circuit 203. The rectified signal is demodulated in the demodulation circuit 205 and then transmitted to the signal processing circuit 202.

Receiving the start signal, the signal processing circuit 202 generates a signal needed for alignment. The signal contains data on the intensity, the frequency, and the like of the radio waves. Then, the modulation circuit 204 applies a voltage to the power feeding device antenna circuit 201 in accordance with the signal and a signal with a certain frequency generated in the oscillator circuit 206, whereby the alignment radio waves are transmitted as a test signal from the power feeding device antenna circuit 201 (A01: transmission of a test signal). Steps following the step A01 (transmission of a test signal) are the same as those in the flow chart of FIG. 7; thus, the above description can be referred to.

According to one embodiment of the present invention, the moving object 100 has the plurality of moving object antenna circuits of the moving object antenna circuit 102. When at least one of the plurality of moving object antenna circuits of the moving object antenna circuit 102 is placed so as to receive radio waves transmitted from the power feeding device 200, power can be supplied to the moving object 100 efficiently. Thus, compared to the case where the moving object has one moving object antenna circuit 102, tolerance of misalignment between the moving object 100 and the power feeding device 200 in charging can be great and data on the positional relationships can be obtained and the positional relationships can be modified easily.

In one embodiment of the present invention, the data on the positional relationships between the power feeding device antenna circuit 201 and the plurality of moving object antenna circuits of the moving object antenna circuit 102 may be extracted from the intensities of the test signal. The data on the positional relationships helps the operator of the moving object 100 to align the moving object 100 and the power feeding device 200 while driving the moving object 100. Alternatively, this data helps the manager of operation of the power feeding device 200 to align the moving object 100 and the power feeding device 200 while operating the power feeding device 200. Accordingly, the moving object 100 and the power feeding device 200 can be easily aligned to prevent power loss caused when the battery is charged. In addition, the intensity of radio waves radiated to the surroundings from the power feeding device 200 without being used for charging can be low.

This embodiment can be implemented in appropriate combination with any of the other embodiments.

Embodiment 5

In this embodiment, a more specific structure of the moving object and the wireless power feeding system using the moving object and a power feeding device according to Embodiment 2 will be described.

Figure 5:
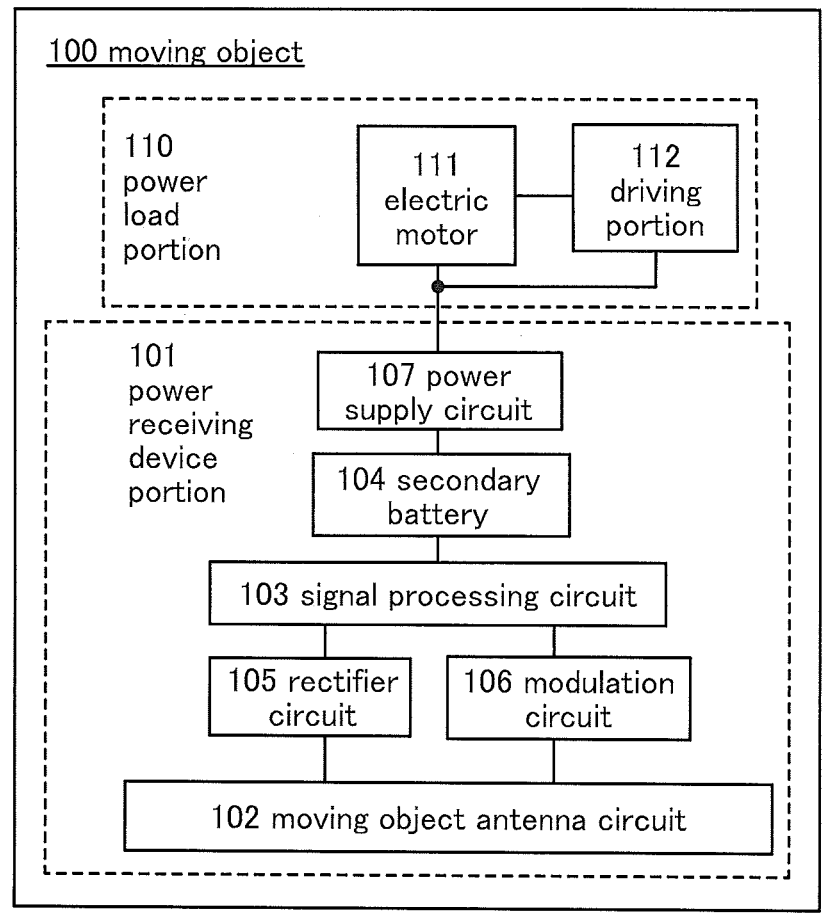
FIG. 5 is a view illustrating a structure of a moving object and a wireless power feeding system.
Figure 5:
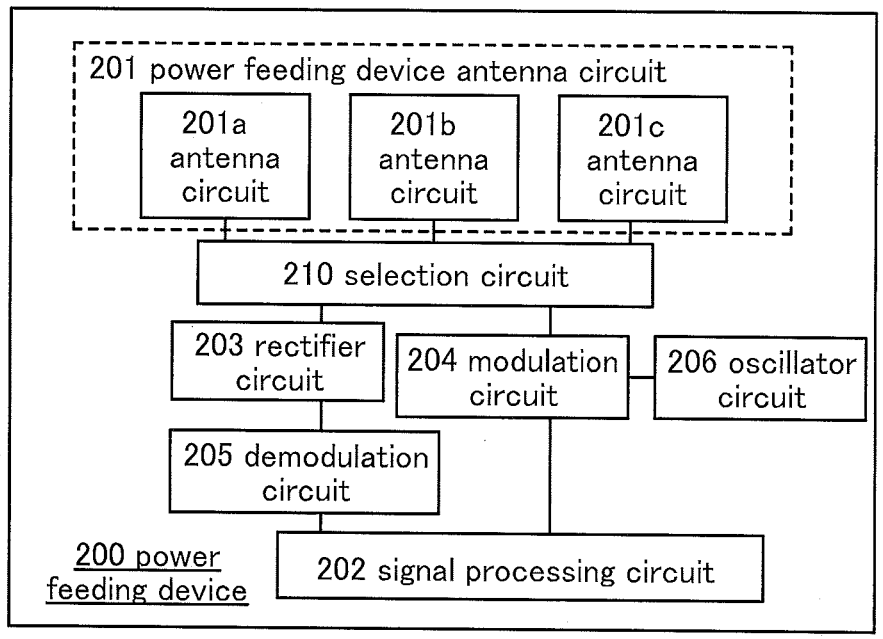

A structure of a moving object and a wireless power feeding system using the moving object and a power feeding device according to one embodiment of the present invention are shown in a block diagram of FIG. 5 by way of an example. In FIG. 5, the moving object 100 includes the power receiving device portion 101 and the power load portion 110 as in FIG. 2.

The power receiving device portion 101 includes at least the moving object antenna circuit 102, the signal processing circuit 103, the secondary battery 104, the rectifier circuit 105, the modulation circuit 106, and the power supply circuit 107. The power load portion 110 includes at least the electric motor 111 and the driving portion 112 whose operation is controlled by the electric motor 111.

FIG. 5 illustrates the case where the moving object antenna circuit 102 has one moving object antenna circuit, as an example; however, it may have a plurality of moving object antenna circuits as in FIG. 4.

The power feeding device 200 includes a plurality of power feeding device antenna circuits of the power feeding device antenna circuit 201, the signal processing circuit 202, the rectifier circuit 203, the modulation circuit 204, the demodulation circuit 205, the oscillator circuit 206, and a selection circuit 210.

Note that in the block diagram of FIG. 5, a DC-DC converter and/or an overcharge control circuit for controlling operation of the power supply circuit 107 so as to prevent the secondary battery 104 from being overcharged may be provided appropriately.

Figure 8:
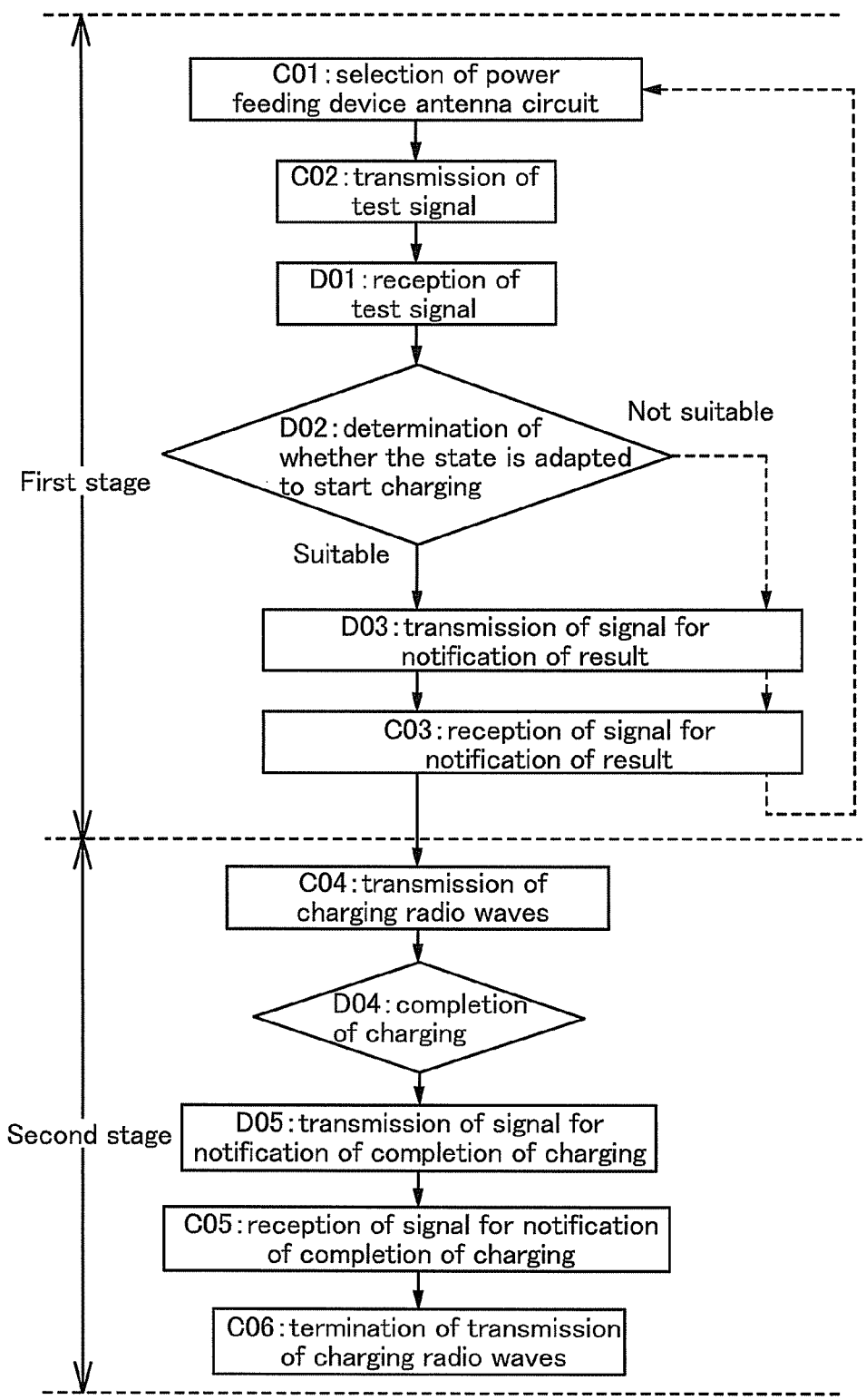
FIG. 8 is a flow chart showing operations of a moving object and a power feeding device.

Next, operations of the moving object 100 and the power feeding device 200 illustrated in FIG. 5 will be described with reference to a flow chart shown in FIG. 8. The operations of the moving object 100 and the power feeding device 200 illustrated in FIG. 5 may include a first stage of selecting one of the power feeding device antenna circuits of the power feeding device antenna circuit 201 and a second stage of performing a charging operation, as will be described below.

First, in the first stage, the selection circuit 210 selects one of the plurality of power feeding device antenna circuits of the power feeding device antenna circuit 201 (C01: selection of a power feeding device antenna circuit). Specifically, the selection circuit 210 controls connection of feeder lines and the power feeding device antenna circuits of the power feeding device antenna circuit 201, whereby selection of one of the power feeding device antenna circuits of the power feeding device antenna circuit 201 is performed. In other words, the power feeding device antenna circuit of the power feeding device antenna circuit 201 can be selected by connecting the feeder line and the power feeding device antenna circuit of the power feeding device antenna circuit 201.

Then, radio waves are transmitted as a test signal from the power feeding device antenna circuit 201 (C02: transmission of a test signal). Specifically, the signal processing circuit 202 generates a signal containing data on the intensity, the frequency, and the like of the radio waves. Then, the modulation circuit 204 applies a voltage to the power feeding device antenna circuit 201 in accordance with the signal and a signal with a certain frequency generated in the oscillator circuit 206, whereby the radio waves are transmitted as the test signal from the power feeding device antenna circuit 201.

The test signal transmitted from the selected power feeding device antenna circuit of the power feeding device antenna circuit 201 is received by the moving object antenna circuit 102 of the moving object 100 (D01: reception of the test signal). The received test signal is converted into an electric signal in the moving object antenna circuit 102, the electric signal is rectified in the rectifier circuit 105, and then the rectified electric signal is transmitted to the signal processing circuit 103.

The intensity of the received test signal depends on the positional relationship in distance, direction, or the like between the moving object antenna circuit 102 and the power feeding device antenna circuit 201. The signal processing circuit 103 determines whether the positional relationship between the moving object antenna circuit 102 and the selected power feeding device antenna circuit of the power feeding device antenna circuit 201 is adapted to start of charging based on the intensity of the test signal transmitted from the rectifier circuit 105 (D02: determination of whether the state is adapted to start of charging).

If the intensity of the received test signal is insufficient, it means that efficiency of energy conversion in converting the radio waves into the electric signal is low. Accordingly, the positional relationship between the moving object antenna circuit 102 and the selected power feeding device antenna circuit of the power feeding device antenna circuit 201 is determined to be not in a state adapted to start of charging.

If the intensity of the received test signal is sufficiently high, it means that efficiency of energy conversion in converting the radio waves into the electric signal is sufficiently high. Accordingly, the positional relationships between the moving object antenna circuit 102 and the plurality of power feeding device antenna circuits of the power feeding device antenna circuit 201 are determined to be in a state adapted to start of charging.

Then, the signal processing circuit 103 generates a signal for notifying the power feeding device 200 of the determination result. Then, the modulation circuit 106 applies a voltage to the moving object antenna circuit 102 in accordance with the signal, whereby the signal for notification of the determination result is transmitted from the moving object antenna circuit 102 by radio waves (D03: transmission of a signal for notification of a result).

Then, the signal for notification of the determination result is received by the selected power feeding device antenna circuit of the power feeding device antenna circuit 201 of the power feeding device 200 (C03: reception of the signal for notification of the result). The received signal is converted into an electric signal in the selected power feeding device antenna circuit of the power feeding device antenna circuit 201 and the electric signal is rectified in the rectifier circuit 203. Note that the signal for notification of the determination result may be received by any of the power feeding device antenna circuits other than the selected power feeding device antenna circuit of the power feeding device antenna circuit 201. The rectified signal is demodulated in the demodulation circuit 205 and then transmitted to the signal processing circuit 202.

In the case where it is determined that the state is not adapted to start of charging in the step D02 (determination of whether the state is adapted to start of charging) performed previously, when the signal processing circuit 202 receives the signal for notification of the determination result, the selection circuit 210 selects one of the other power feeding device antenna circuits of the power feeding device antenna circuit 201 (C01: selection of a power feeding device antenna circuit) and the following steps up to the step C03 (reception of the signal for notification of the result) are performed again.

In the case where it is determined that the state is adapted to start of charging in the step D02 (determination of whether the state is adapted to start of charging) performed previously, when the signal processing circuit 202 receives the signal for notification of the determination result, the operations of the moving object 100 and the power feeding device 200 shift from the first stage to the second stage.

Note that even in the case where it is determined that the state is adapted to start of charging in the step D02 (determination of whether the state is adapted to start of charging), the steps C01 (selection of a power feeding device antenna circuit) to C03 (reception of the signal for notification of the result) may be repeated. In such a manner, which of all of the power feeding device antenna circuits of the power feeding device antenna circuit 201 can supply radio waves to the moving object 100 most efficiently may be determined. Alternatively, a plurality of the power feeding device antenna circuits of the power feeding device antenna circuit 201, which can supply radio waves to the moving object 100 efficiently, may be selected.

In the second stage, charging radio waves are transmitted by the selected power feeding device antenna circuit of the power feeding device antenna circuit 201 in accordance with the determination of the power feeding device antenna circuit of the power feeding device antenna circuit 201 selected to realize the state adapted to start of charging, which has been performed in the first stage (C04: transmission of charging radio waves). Specifically, the signal processing circuit 202 generates a signal containing data on the intensity, the frequency, and the like of the radio waves. Then, the modulation circuit 204 applies a voltage to the selected power feeding device antenna circuit of the power feeding device antenna circuit 201 in accordance with the signal and a signal with a certain frequency generated in the oscillator circuit 206, whereby the charging radio waves are transmitted from the power feeding device antenna circuit 201.

The charging radio waves transmitted from the power feeding device antenna circuit 201 are received by the moving object antenna circuit 102 of the moving object 100. The received charging radio waves are converted into an electric signal in the moving object antenna circuit 102, the electric signal is rectified in the rectifier circuit 105, and then the rectified electric signal is transmitted to the signal processing circuit 103. Then, the electric signal is transmitted from the signal processing circuit 103 to the secondary battery 104 in which the electric signal is stored as electric energy.

After charging of the secondary battery 104 is completed (D04: completion of charging), the signal processing circuit 103 generates a signal for notifying the power feeding device 200 of completion of charging. Then, the modulation circuit 106 applies a voltage to the moving object antenna circuit 102 in accordance with the signal, whereby the signal for notification of completion of charging is transmitted from the moving object antenna circuit 102 by radio waves (D05: transmission of a signal for notification of completion of charging).

Then, the signal for notification of completion of charging is received by the selected power feeding device antenna circuit of the power feeding device antenna circuit 201 of the power feeding device 200 (C05: reception of the signal for notification of completion of charging). Note that the signal for notification of completion of charging may be received by any of the power feeding device antenna circuits other than the selected power feeding device antenna circuit of the power feeding device antenna circuit 201. The received signal is converted into an electric signal in the selected power feeding device antenna circuit of the power feeding device antenna circuit 201 and the electric signal is rectified in the rectifier circuit 203. The rectified signal is demodulated in the demodulation circuit 205 and then transmitted to the signal processing circuit 202. Receiving the signal for notification of completion of charging, the signal processing circuit 202 transmits to the oscillator circuit 206 and the modulation circuit 204 a signal for stopping transmission of the radio waves in order to stop the charging radio waves (C06: termination of the transmission of the charging radio waves).

Electric energy stored in the secondary battery 104 is made to have a constant voltage in the power supply circuit 107 and supplied to the electric motor 111. The electric motor 111 converts the supplied electric energy into mechanical energy to operate the driving portion 112.

In this embodiment, the signal processing circuit 103 in the moving object 100 determines whether charging of the secondary battery 104 should be started and transmits the determination result as a radio wave signal to the power feeding device 200; however, one embodiment of the present invention is not limited to that structure. For example, data on the intensity of the received test signal may be transmitted as a radio wave signal without any change from the moving object 100 to the power feeding device 200 in which it may be then determined whether to start the charging of the secondary battery 104.

As a modulation method used by the modulation circuit 106 or the modulation circuit 204, any of a variety of methods can be employed as in Embodiment 4.

The modulation circuit 106 modulates carriers (carrier waves) transmitted from the selected power feeding device antenna circuit of the power feeding device antenna circuit 201 by applying a voltage to the moving object antenna circuit 102 in accordance with the signal for notification of completion of charging, whereby the signal is transmitted from the moving object 100 to the power feeding device 200. Alternatively, carriers (carrier waves) are not transmitted from the power feeding device antenna circuit 201, an oscillator circuit may be provided in the power receiving device portion 101 included in the moving object 100, and the modulation circuit 106 may apply a voltage to the moving object antenna circuit 102 in accordance with the signal and a signal with a certain frequency generated in the oscillator circuit so that the signal for notification of completion of charging is transmitted from the moving object 100 to the power feeding device 200.

Note that an oscillator circuit may be provided in the power receiving device portion 101 included in the moving object 100 and a start signal may be transmitted from the moving object 100 in the first step of the first stage in order to instruct the power feeding device 200 to transmit a test signal. In that case, the oscillator circuit may be electrically connected to the modulation circuit 106. After the signal processing circuit 103 generates the start signal containing data on the intensity, the frequency, and the like of the radio waves, the modulation circuit 106 applies a voltage to the moving object antenna circuit 102 in accordance with the signal and a signal with a certain frequency generated in the oscillator circuit, whereby the start signal is transmitted from the moving object antenna circuit 102 by radio waves.

Then, the start signal is received by the plurality of power feeding device antenna circuits of the power feeding device antenna circuit 201 of the power feeding device 200. Alternatively, the start signal may be received by the power feeding device antenna circuit selected from the plurality of power feeding device antenna circuits of the power feeding device antenna circuit 201. In either case, the received signal is converted into an electric signal in the power feeding device antenna circuit 201 and the electric signal is rectified in the rectifier circuit 203. The rectified signal is demodulated in the demodulation circuit 205 and then transmitted to the signal processing circuit 202.

When the signal processing circuit 202 receives the start signal, the selection circuit 210 selects one of the plurality of power feeding device antenna circuits of the power feeding device antenna circuit 201 (C01: selection of a power feeding device antenna circuit). Steps following the step C01 (selection of a power feeding device antenna circuit) are the same as those in the flow chart of FIG. 8; thus, the above description can be referred to.

In one embodiment of the present invention, the power feeding device 200 has the plurality of power feeding device antenna circuits of the power feeding device antenna circuit 201. When the moving object 100 is placed so as to receive radio waves transmitted from at least one of the power feeding device antenna circuits of the power feeding device antenna circuit 201, power can be supplied to the moving object 100 efficiently. Thus, compared to the case where the power feeding device has one power feeding device antenna circuit 201, tolerance of misalignment between the moving object 100 and the power feeding device 200 in charging can be great. Accordingly, the moving object 100 and the power feeding device 200 can be easily aligned to prevent power loss caused when the battery is charged. In addition, the intensity of radio waves radiated to the surroundings from the power feeding device 200 without being used for charging can be low.

This embodiment can be implemented in appropriate combination with any of the other embodiments.

Embodiment 6

In this embodiment, a more specific structure of the moving object and the wireless power feeding system using the moving object and a power feeding device according to Embodiment 3 will be described.

Figure 6:
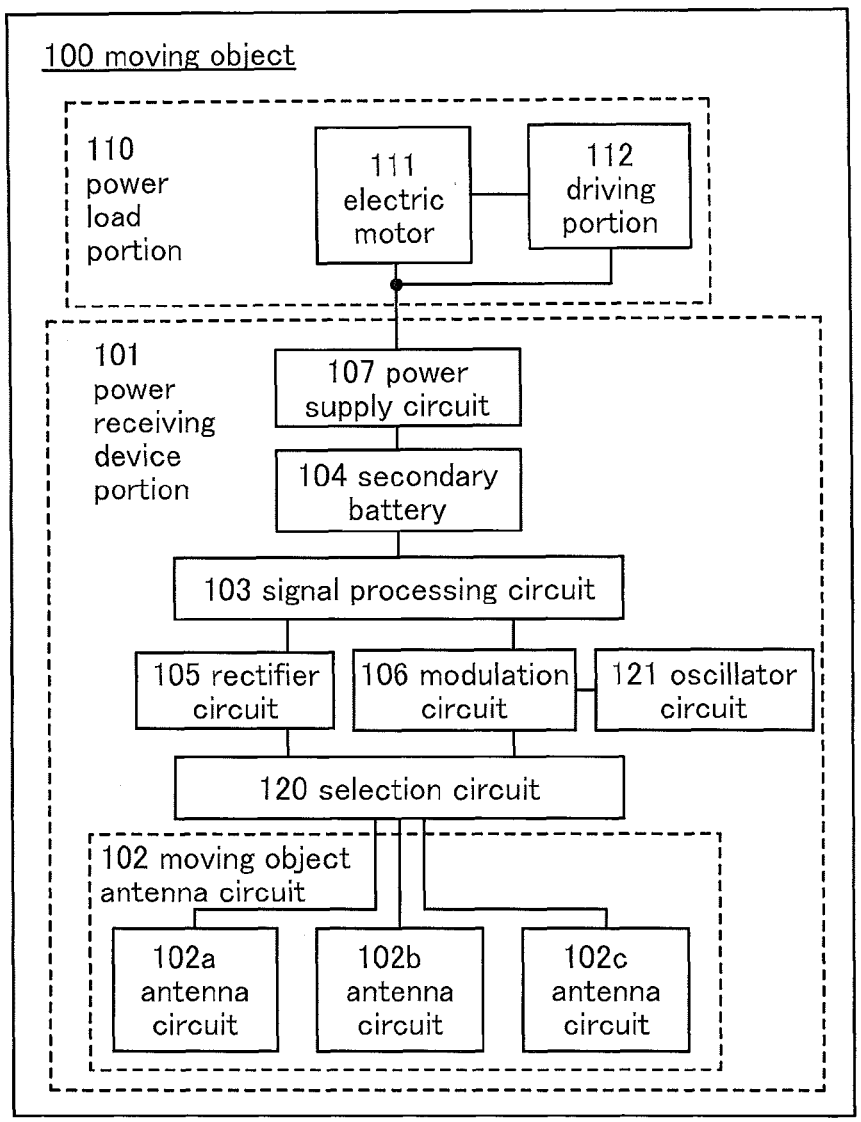
FIG. 6 is a view illustrating a structure of a wireless power feeding system including a moving object and a power feeding device.
Figure 6:
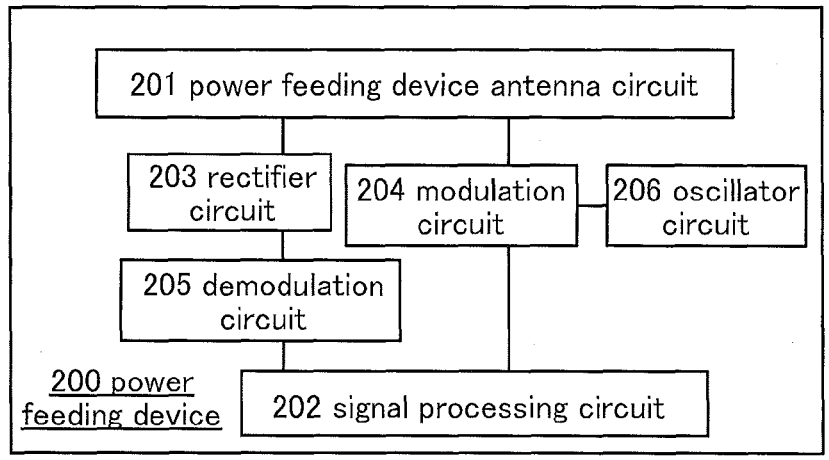

A structure of a moving object and a wireless power feeding system using the moving object and a power feeding device according to one embodiment of the present invention are shown in a block diagram of FIG. 6 by way of an example. In FIG. 6, the moving object 100 includes the power receiving device portion 101 and the power load portion 110 as in FIG. 3.

The power receiving device portion 101 includes at least a plurality of moving object antenna circuits of the moving object antenna circuit 102, the signal processing circuit 103, the secondary battery 104, the rectifier circuit 105, the modulation circuit 106, the power supply circuit 107, the selection circuit 120, and an oscillator circuit 121. The power load portion 110 includes at least the electric motor 111 and the driving portion 112 whose operation is controlled by the electric motor 111.

The power feeding device 200 includes at least the power feeding device antenna circuit 201, the signal processing circuit 202, the rectifier circuit 203, the modulation circuit 204, the demodulation circuit 205, and the oscillator circuit 206.

FIG. 6 illustrates the case where the power feeding device antenna circuit 201 has one power feeding device antenna circuit, as an example; however, it may have a plurality of power feeding device antenna circuits as in FIG. 5. Note that in the case where the power feeding device antenna circuit 201 has a plurality of power feeding device antenna circuits, the selection circuit 210 for selecting the power feeding device antenna circuit of the power feeding device antenna circuit 201 is provided in the power feeding device 200 as in FIG. 5.

Note that in the block diagram of FIG. 6, a DC-DC converter and/or an overcharge control circuit for controlling operation of the power supply circuit 107 so as to prevent the secondary battery 104 from being overcharged may be provided appropriately.

Figure 9:
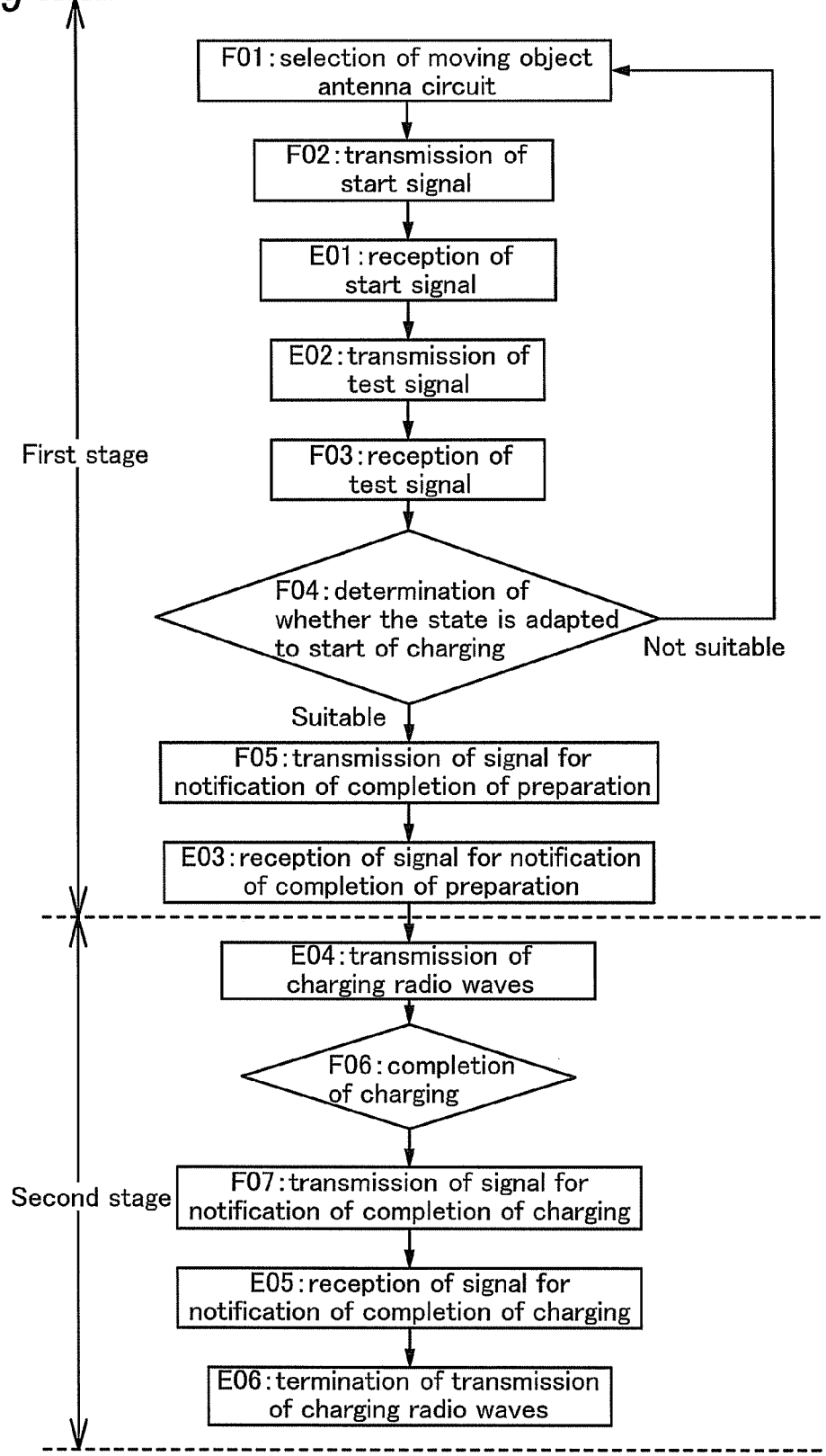
FIG. 9 is a flow chart showing operations of a moving object and a power feeding device.

Next, operations of the moving object 100 and the power feeding device 200 which are illustrated in FIG. 6 will be described with reference to a flow chart shown in FIG. 9. The operations of the moving object 100 and the power feeding device 200 illustrated in FIG. 6 may include a first stage of selecting one of the moving object antenna circuits of the moving object antenna circuit 102 and a second stage of performing a charging operation, as will be described below.

First, in the first stage, the selection circuit 120 selects one of the plurality of moving object antenna circuits of the moving object antenna circuit 102 (F01: selection of a moving object antenna circuit). Specifically, the selection circuit 120 controls connection of feeder lines and the moving object antenna circuits of the moving object antenna circuit 102, whereby selection of one of the moving object antenna circuits of the moving object antenna circuit 102 is performed. In other words, the moving object antenna circuit of the moving object antenna circuit 102 can be selected by connecting the feeder line and the moving object antenna circuit of the moving object antenna circuit 102.

Then, a start signal is transmitted from the moving object 100 to instruct the power feeding device 200 to transmit a test signal (F02: transmission of a start signal). Specifically, first, the signal processing circuit 103 generates a start signal containing data on the intensity, the frequency, and the like of radio waves. Then, the modulation circuit 106 applies a voltage to the moving object antenna circuit 102 in accordance with the signal and a signal with a certain frequency generated in the oscillator circuit 121, whereby the start signal is transmitted from the selected moving object antenna circuit of the moving object antenna circuit 102 by radio waves.

Then, the start signal is received by the power feeding device antenna circuit 201 of the power feeding device 200 (E01: reception of the start signal). The received signal is converted into an electric signal in the power feeding device antenna circuit 201 and the electric signal is rectified in the rectifier circuit 203. The rectified signal is demodulated in the demodulation circuit 205 and then transmitted to the signal processing circuit 202.

When the signal processing circuit 202 receives the start signal, radio waves are transmitted as a test signal from the power feeding device antenna circuit 201 (E02: transmission of a test signal). Specifically, the signal processing circuit 202 generates a signal containing data on the intensity, the frequency, and the like of the radio waves. Then, the modulation circuit 204 applies a voltage to the power feeding device antenna circuit 201 in accordance with the signal and a signal with a certain frequency generated in the oscillator circuit 206, whereby the radio waves are transmitted as the test signal from the power feeding device antenna circuit 201.

The test signal transmitted from the power feeding device antenna circuit 201 is received by the selected moving object antenna circuit of the moving object antenna circuit 102 of the moving object 100 (F03: reception of the test signal). The received test signal is converted into an electric signal in the selected moving object antenna circuit of the moving object antenna circuit 102, the electric signal is rectified in the rectifier circuit 105, and then the rectified electric signal is transmitted to the signal processing circuit 103.

The intensity of the received test signal depends on the positional relationship in distance, direction, or the like between the power feeding device antenna circuit 201 and the moving object antenna circuit 102. The signal processing circuit 103 determines whether the positional relationship between the selected moving object antenna circuit of the moving object antenna circuit 102 and the power feeding device antenna circuit 201 is adapted to start of charging based on the intensity of the test signal transmitted from the rectifier circuit 105 (F04: determination of whether the state is adapted to start of charging).

If the intensity of the received test signal is insufficient, it means that the efficiency of energy conversion in converting the radio waves into the electric signal is low. Accordingly, the positional relationship between the power feeding device antenna circuit 201 and the selected moving object antenna circuit of the moving object antenna circuit 102 are determined to be not in a state adapted to start of the charging. In the case where the state is not adapted to start of charging, the selection circuit 120 selects one of the other moving object antenna circuits of the moving object antenna circuit 102 (F01: selection of a moving object antenna circuit) and the following steps up to the step F04 (determination of whether the state is adapted to start of charging) are performed again.

If the intensity of the received test signal is sufficiently high, it means that efficiency of energy conversion in converting the radio waves into the electric signal is sufficiently high. Accordingly, the positional relationship between the power feeding device antenna circuit 201 and the selected moving object antenna circuits of the moving object antenna circuit 102 is determined to be in a state adapted to start of charging.

Determination that the state is adapted to start of charging means that selection of the moving object antenna circuit of the moving object antenna circuit 102 has been finished and preparation for charging has been completed. In that case, the signal processing circuit 103 generates a signal for notifying the power feeding device 200 of completion of preparation. Then, the modulation circuit 106 applies a voltage to the selected moving object antenna circuit of the moving object antenna circuit 102 in accordance with the signal, whereby the signal for notification of completion of preparation is transmitted from the moving object antenna circuit 102 by radio waves (F05: transmission of a signal for notification of completion of preparation).

Then, the signal for notification of completion of preparation is received by the power feeding device antenna circuit 201 of the power feeding device 200 (E03: reception of the signal for notification of completion of preparation). The received signal is converted into an electric signal in the power feeding device antenna circuit 201 and the electric signal is rectified in the rectifier circuit 203. The rectified signal is demodulated in the demodulation circuit 205 and then transmitted to the signal processing circuit 202. When the signal processing circuit 202 receives the signal for notification of completion of preparation, the operations of the moving object 100 and the power feeding device 200 shift from the first stage to the second stage.

Note that even in the case where it is determined that the state is adapted to start of charging, the selection circuit 120 may select one of the other moving object antenna circuits of the moving object antenna circuit 102 (F01: selection of a moving object antenna circuit) and the following steps up to the step F04 (determination of whether the state is adapted to start of charging) may be performed again. In such a manner, which of all of the moving object antenna circuits of the moving object antenna circuit 102 can supply radio waves to the moving object 100 most efficiently may be determined. Alternatively, a plurality of the moving object antenna circuits of the moving object antenna circuit 102, which can supply radio waves to the moving object 100 efficiently, may be selected.

In the second stage, charging is started in accordance with the determination of the moving object antenna circuit of the moving object antenna circuit 102 selected to realize the state adapted to start of charging, which has been performed in the first stage. Specifically, the signal processing circuit 202 generates a signal containing data on the intensity, the frequency, and the like of the radio waves. Then, the modulation circuit 204 applies a voltage to the power feeding device antenna circuit 201 in accordance with the signal and a signal with a certain frequency generated in the oscillator circuit 206, whereby the charging radio waves are transmitted from the power feeding device antenna circuit 201 (E04: transmission of charging radio waves).

The charging radio waves transmitted from the power feeding device antenna circuit 201 are received by the selected moving object antenna circuit of the moving object antenna circuit 102 of the moving object 100. The received charging radio waves are converted into an electric signal in the moving object antenna circuit 102, the electric signal is rectified in the rectifier circuit 105, and then the rectified electric signal is transmitted to the signal processing circuit 103. After that, the electric signal is transmitted from the signal processing circuit 103 to the secondary battery 104 in which the electric signal is stored as electric energy.

After charging of the secondary battery 104 is completed (F06: completion of charging), the signal processing circuit 103 generates a signal for notifying the power feeding device 200 of completion of charging. Then, the modulation circuit 106 applies a voltage to the selected moving object antenna circuit of the moving object antenna circuit 102 in accordance with the signal, whereby the signal for notification of completion of charging is transmitted from the moving object antenna circuit of the moving object antenna circuit 102 by radio waves (F07: transmission of a signal for notification of completion of charging). Note that the signal for notification of completion of charging may be transmitted from any of the moving object antenna circuits other than the selected moving object antenna circuit of the moving object antenna circuit 102.

Then, the signal for notification of completion of charging is received by the power feeding device antenna circuit 201 of the power feeding device 200 (E05: reception of the signal for notification of completion of charging). The received signal is converted into an electric signal in the power feeding device antenna circuit 201 and the electric signal is rectified in the rectifier circuit 203. The rectified signal is demodulated in the demodulation circuit 205 and then transmitted to the signal processing circuit 202. Receiving the signal for notification of completion of charging, the signal processing circuit 202 transmits to the oscillator circuit 206 and the modulation circuit 204 a signal for stopping transmission of the radio waves in order to stop the transmission of the charging radio waves (E06: termination of the transmission of the charging radio waves).

Electric energy stored in the secondary battery 104 is made to have a constant voltage in the power supply circuit 107 and supplied to the electric motor 111. The electric motor 111 converts the supplied electric energy into mechanical energy to operate the driving portion 112.

In this embodiment, the signal processing circuit 103 in the moving object 100 determines whether charging of the secondary battery 104 should be started and transmits the determination result as a radio wave signal to the power feeding device 200; however, one embodiment of the present invention is not limited to that structure. For example, data on the intensity of the received test signal may be transmitted as a radio wave signal without any change from the moving object 100 to the power feeding device 200 in which it may be then determined whether to start the charging of the secondary battery 104.

As a modulation method used by the modulation circuit 106 or the modulation circuit 204, any of a variety of methods can be employed as in Embodiment 4.

The modulation circuit 106 modulates carriers (carrier waves) transmitted from the power feeding device antenna circuit 201 by applying a voltage to the moving object antenna circuit of the moving object antenna circuit 102 in accordance with the signal for notification of completion of preparation or the signal for notification of completion of charging, so that the signal is transmitted from the moving object 100 to the power feeding device 200. Alternatively, carriers (carrier waves) are not transmitted from the power feeding device antenna circuit 201, an oscillator circuit may be provided in the power receiving device portion 101 included in the moving object 100, and the modulation circuit 106 may apply a voltage to the moving object antenna circuit 102 in accordance with the signal and a signal with a certain frequency generated in the oscillator circuit so that the signal is transmitted from the moving object 100 to the power feeding device 200.

According to one embodiment of the present invention, the moving object 100 has the plurality of moving object antenna circuits of the moving object antenna circuit 102. When at least one of the plurality of moving object antenna circuits of the moving object antenna circuit 102 is placed so as to receive radio waves transmitted from the power feeding device antenna circuit 201, power can be supplied to the moving object 100 efficiently. Thus, compared to the case where the moving object has one moving object antenna circuit 102, tolerance of misalignment between the moving object 100 and the power feeding device 200 in charging can be great. Accordingly, the moving object 100 and the power feeding device 200 can be easily aligned to prevent power loss caused when the battery is charged. In addition, the intensity of radio waves radiated to the surroundings from the power feeding device 200 without being used for charging can be low.

This embodiment can be implemented in appropriate combination with any of the other embodiments.

Embodiment 7

In this embodiment, a structural example of the moving object 100 which is different from those in Embodiments 1 to 6 will be described.

Figure 10:
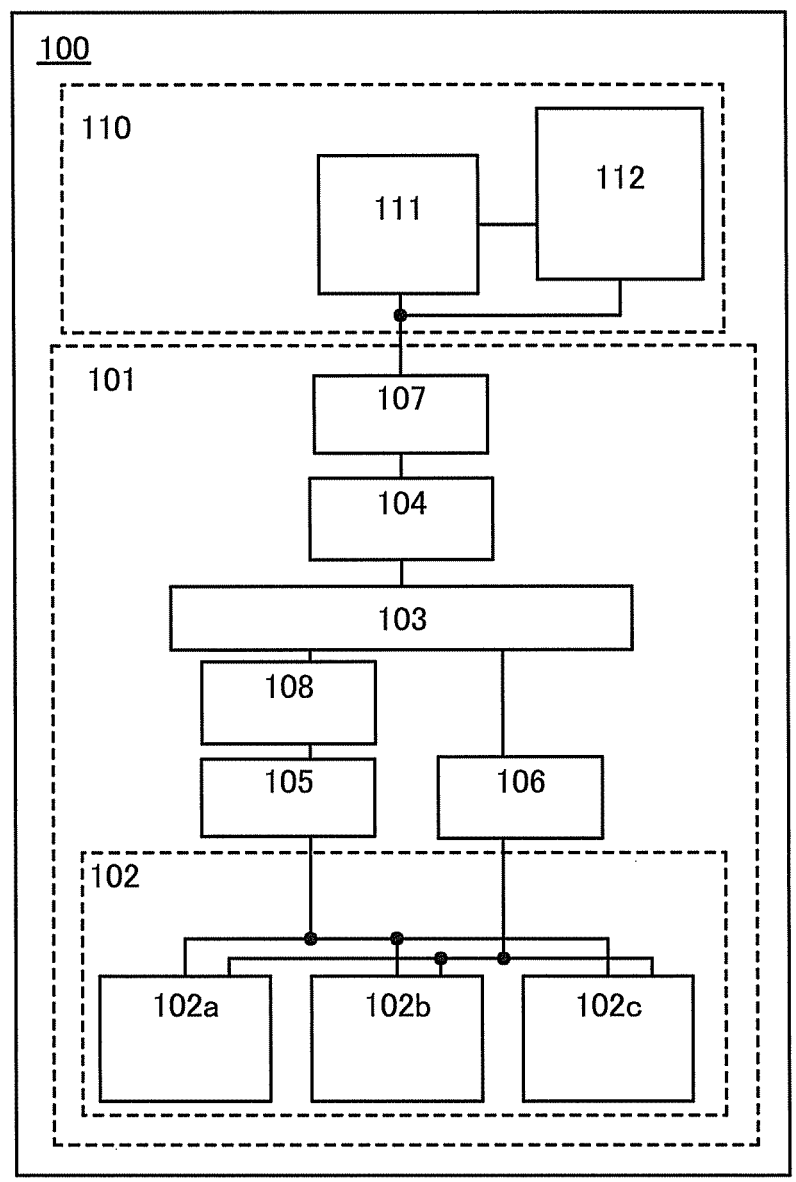
FIG. 10 is a view showing a structure of a moving object.

FIG. 10 illustrates a structure where a demodulation circuit 108 is provided in the power receiving device portion 101 in addition to the components of the moving object 100 in FIG. 4. The operation of the moving object 100 in FIG. 10 can be described with reference to the flow chart of FIG. 7 as in the case of FIG. 4. Note that in the case where a start signal is transmitted from the moving object 100 first, an oscillator circuit is provided in the power receiving device portion 101 of the moving object 100 and the oscillator circuit may be electrically connected to the modulation circuit 106. In the case of FIG. 10, when the test signal is received by the moving object antenna circuit 102 (B01: reception of the test signal), the received test signal is converted into an electric signal in the moving object antenna circuit 102, the electric signal is rectified in the rectifier circuit 105, and then the rectified electric signal is demodulated in the demodulation circuit 108. After that, the demodulated test signal is transmitted to the signal processing circuit 103.

When the intensity of the demodulated test signal is not sufficiently high, the signal processing circuit 103 cannot perform signal processing in accordance with the test signal. In that case, the following step of generating a signal for notifying the power feeding device 200 of completion of preparation cannot be performed. On the other hand, when the intensity of the demodulated test signal is sufficiently high, signal processing is performed in accordance with the test signal. In that case, the following step of generating a signal for notifying the power feeding device 200 of completion of preparation can be performed. In other words, whether the signal processing circuit 103 can perform signal processing depends on the intensity of the demodulated test signal; thus, whether the state is adapted to start of charging can be determined based on the intensity of the demodulated test signal (B02: determination of whether the state is adapted to start of charging).

Note that in FIG. 10, charging radio waves may be converted into an electric signal in the moving object antenna circuit 102, the electric signal may be rectified in the rectifier circuit 105, and then the rectified electric signal may be transmitted to the signal processing circuit 103 not through the demodulation circuit 108.

Although FIG. 10 illustrates the structure where the demodulation circuit 108 is provided in the moving object 100 in addition to the components of the moving object 100 in FIG. 4, the demodulation circuit 108 may be provided in addition to the components of the moving object 100 in FIG. 5 or FIG. 6.

Figure 11:
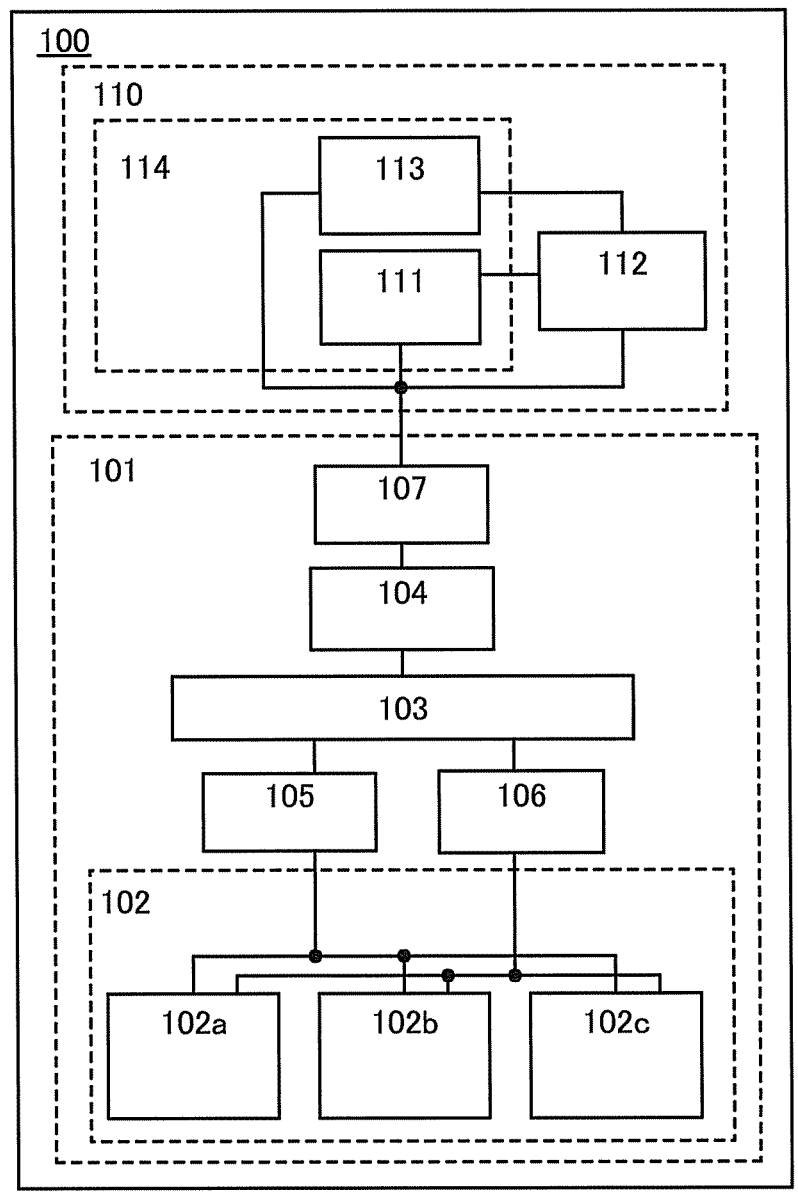
FIG. 11 is a view showing a structure of a moving object.

FIG. 11 illustrates a structure where a combustion engine 113 is provided in the power load portion 110 in addition to the components of the moving object 100 in FIG. 4.

FIG. 11 is different from FIG. 4 in that the moving object 100 includes the combustion engine 113 in the power load portion 110 and the electric motor 111 and the combustion engine 113 function as a prime motor 114. The electric energy stored in the secondary battery 104 is made to have a constant voltage in the power supply circuit 107, which is then supplied to the electric motor 111 and the combustion engine 113.

The electric motor 111 converts the supplied electric energy into mechanical energy to actuate the driving portion 112. In addition, as a spark plug is ignited by the supplied electric energy, the combustion engine 113 is started to actuate the driving portion 112.

Note that although FIG. 11 illustrates the structure where the combustion engine 113 is provided in the moving object 100 in addition to the components of the moving object 100 in FIG. 4, the combustion engine 113 may be provided in addition to the components of the moving object 100 in FIG. 5 or FIG. 6.

Figure 12:
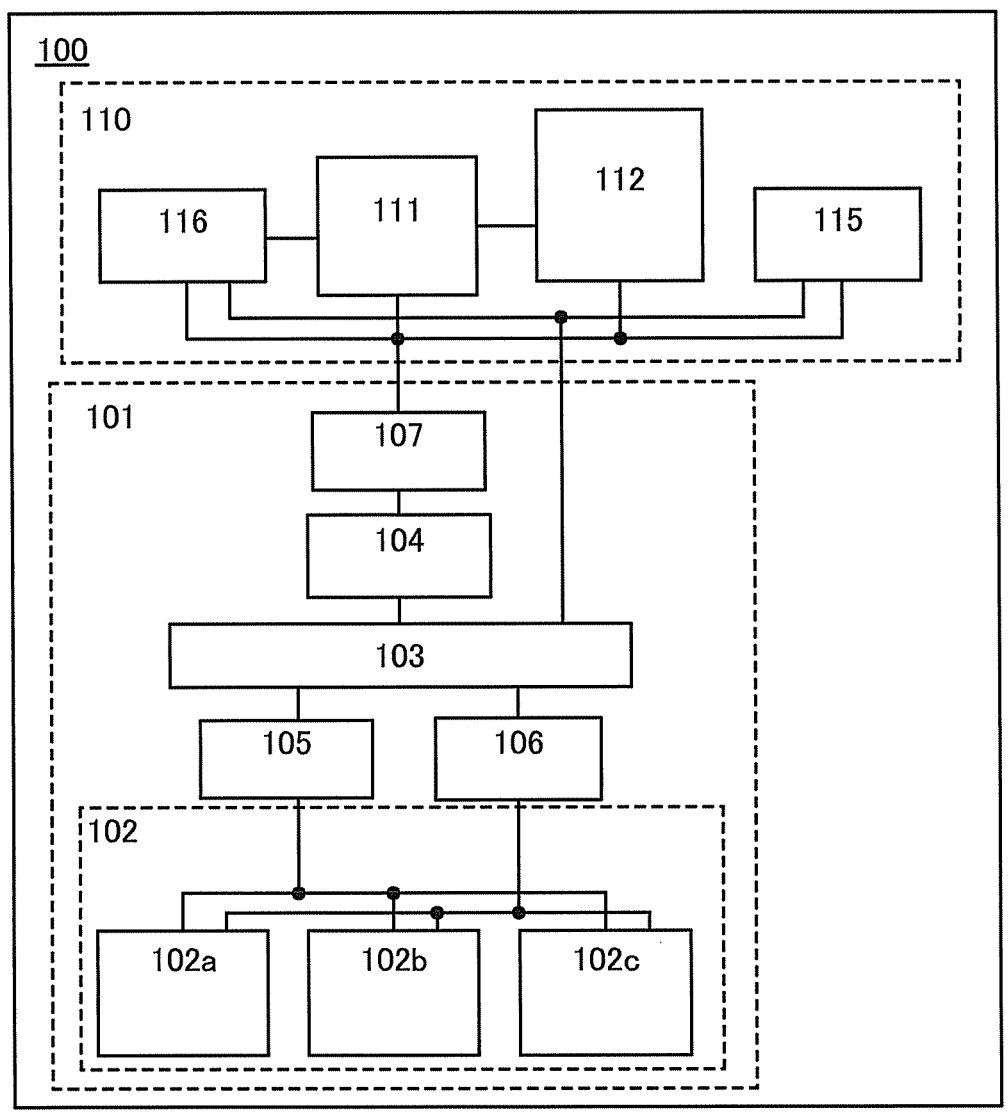
FIG. 12 is a view showing a structure of a moving object.

FIG. 12 illustrates a structure where an output device 115 and an input device 116 are provided in the power load portion 110 in addition to the components of the moving object 100 in FIG. 4, as an example.

FIG. 12 is different from FIG. 4 in that the moving object 100 includes the output device 115 and an input device 116 in the power load portion 110. The output device 115 is a device which outputs data extracted from a test signal in the signal processing circuit 103 and examples of the output device 115 include a display, a light, and a speaker. The input device 116 is a device which inputs external data to the moving object 100 and examples of the input device 116 include a handle, a brake, an accelerator, and a switch.

Figure 7:
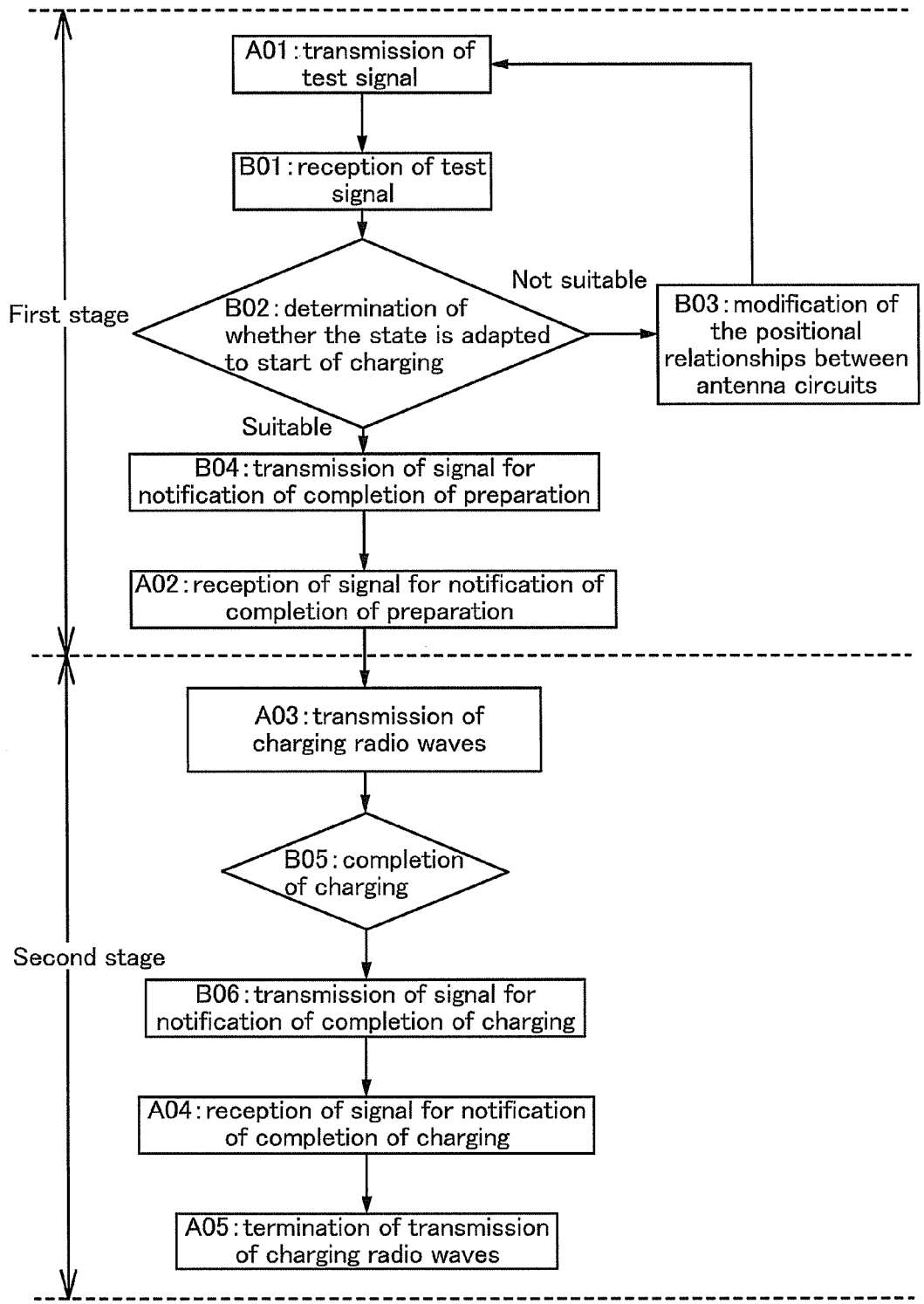
FIG. 7 is a flow chart showing operations of a moving object and a power feeding device.

If it has been determined in the flow chart shown in FIG. 7 whether or not the state is adapted to start of charging (B02: determination on whether the positional relationship is in a state adapted to start of charging), data on the determination result can be output from the output device 115. Alternatively, data on relative intensity of a test signal received in the moving object 100 may be output from the output device 115 and the determination on whether the positional relationship is in a state adapted to start of charging may be made by an operator.

An operator of the moving object 100 may use the data output from the output device 115 to determine the positional relationship between the moving object 100 and the power feeding device 200 or whether or not there is a need to modify the positional relationship.

If there is a need to modify the positional relationship, the operator of the moving object 100 inputs data to be used to modify the position or direction of the moving object 100 to the moving object 100 from the input device 116. Then, the operation of the driving portion 112 is controlled based on the data input from the input device 116, whereby the position or direction of the moving object 100 or the moving object antenna circuit 102 is modified.

If there is no need to modify the positional relationship, data on an instruction to proceed to the next step can be input to the moving object 100 from the input device 116.

In addition, the output device 115 may output the data on how far the operation proceeds in a series of steps from the initiation of alignment to the completion of power transmission to the moving object 100.

Although FIG. 12 illustrates the structure where the output device 115 and the input device 116 are provided in the moving object 100 in addition to the components of the moving object 100 in FIG. 4, the output device 115 and the input device 116 may be provided in addition to the components of the moving object 100 in FIG. 5 or FIG. 6.

Note that in FIG. 11 and FIG. 12, in the case where the start signal is transmitted from the moving object 100 first, an oscillator circuit may be provided in the power receiving portion 101 in the moving object 100 and the oscillator circuit may be electrically connected to the modulation circuit 106.

In addition, in the block diagrams shown in FIG. 10, FIG. 11, and FIG. 12, a DC-DC converter or an overcharging control circuit for controlling the operation of the power supply circuit 107 so as to prevent overcharging of the secondary battery 104 may be properly provided.

This embodiment can be implemented in appropriate combination with any of the other embodiments.

Embodiment 8

In this embodiment, structures of a moving object antenna circuit and a power feeding device antenna circuit will be described.

Antenna circuits used as the moving object antenna circuit and the power feeding device antenna circuit can each be formed of an LC circuit including an antenna and a capacitor.

Figure 13A:
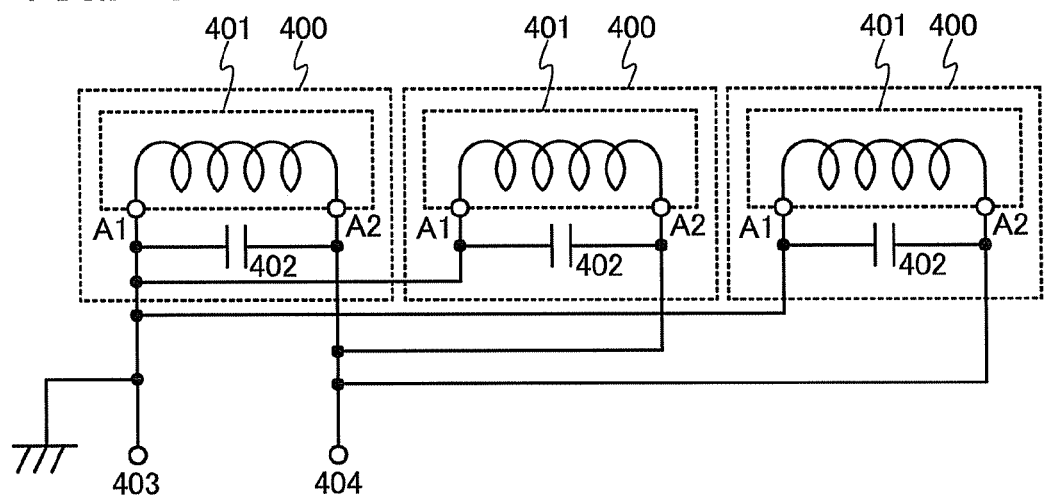
FIGS. 13A and 13B are circuit diagrams of antenna circuits.

FIG. 13A is a circuit diagram illustrating an example of antenna circuits. As each of a plurality of antenna circuits 400 illustrated in FIG. 13A, a parallel LC circuit including an antenna 401 and a capacitor 402 is used. The antenna circuits 400 are connected in parallel.

Specifically, a feeding point A1 and a feeding point A2 of the antenna 401 are connected to an input terminal 403 and an input terminal 404, respectively. Electrodes of the capacitor 402 are respectively connected to the feeding points A1 and A2.

Each of the antenna circuits 400 is given a potential through feeder lines from the input terminal 403 and the input terminal 404. FIG. 13A illustrates a case where a fixed potential such as a ground potential is supplied to the input terminal 403 through a feeder line. An AC voltage is applied between the input terminal 403 and the input terminal 404.

Note that "connection" in this specification means electrical connection and corresponds to the state in which a current, a voltage, or a potential can be supplied, applied, or conducted. Therefore, the state of connection does not always mean a state of direct connection but includes in its category a state of indirect connection through a circuit element such as a wiring, a resistor, a diode, or a transistor, in which a current, a voltage, or a potential can be supplied, applied, or conducted.

Figure 13B:
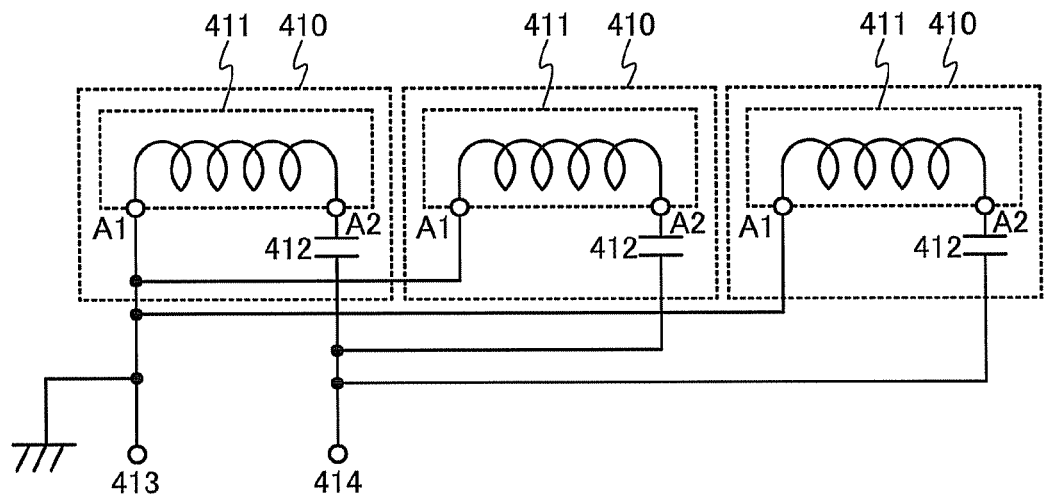

FIG. 13B is a circuit diagram illustrating another example of antenna circuits. As each of a plurality of antenna circuits 410 illustrated in FIG. 13B, a serial LC circuit including an antenna 411 and a capacitor 412 is used. The antenna circuits 410 are connected in parallel.

Specifically, the feeding point A1 of each of the antennas 411 is connected to an input terminal 413. One of a pair of electrodes of the capacitor 412 is connected to the feeding point A2 and the other is connected to an input terminal 414.

Each of the antenna circuits 410 is given a potential through feeder lines from the input terminal 413 and the input terminal 414. FIG. 13B illustrates a case where a fixed potential such as a ground potential is supplied to the input terminal 413 through a feeder line. An AC voltage is applied between the input terminal 413 and the input terminal 414.

FIGS. 13A and 13B illustrate the cases where each antenna circuit includes a capacitor; however, one embodiment of the present invention is not limited to this structure. A plurality of antenna circuits may share one capacitor.

In the case where one or more of the plurality of antenna circuits are selected, a selection circuit controls connection between the plurality of antenna circuit(s) and the feeder line(s).

Figure 14A:
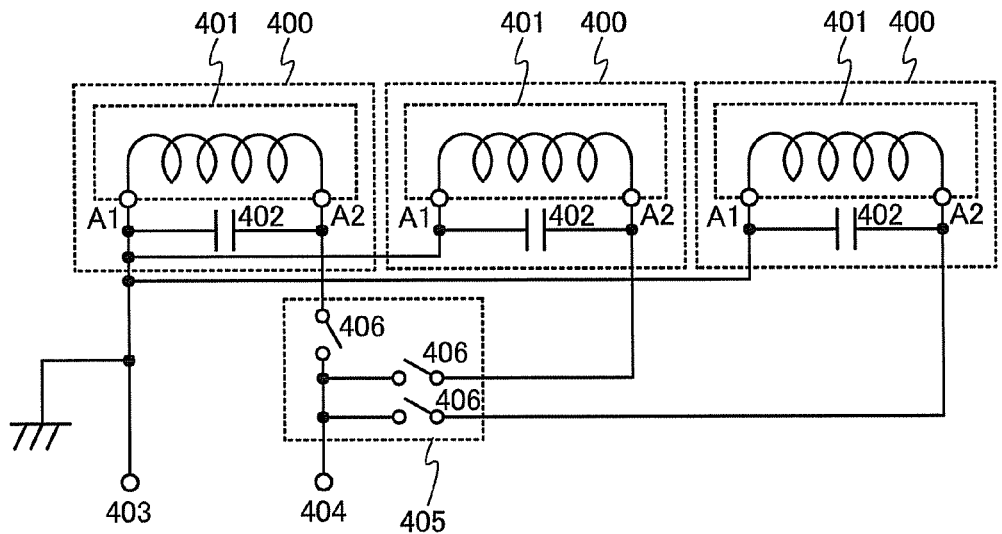
FIGS. 14A and 14B are circuit diagrams of antenna circuits.

FIG. 14A illustrates an example of a structure of the connection between the plurality of antenna circuits and a selection circuit. As each of the plurality of antenna circuits 400 illustrated in FIG. 14A, a parallel LC circuit including the antenna 401 and the capacitor 402 is used as in the case of FIG. 13A.

The feeding point A1 of each of the antennas 401 is connected to the input terminal 403. Electrodes of the capacitor 402 are respectively connected to the feeding points A1 and A2. A selection circuit 405 is provided with a plurality of switching elements 406 for controlling connection between the input terminal 404 and the feeding points A2 of the plurality of antennas 401. By switching between on and off of the switching elements 406, selection from the plurality of antenna circuits 400 is performed.

The antenna circuit 400 selected by turning on the corresponding switching element 406 is given a potential through feeder lines from the input terminal 403 and the input terminal 404. FIG. 14A illustrates a case where a fixed potential such as a ground potential is supplied to the input terminal 403 through a feeder line. An AC voltage is applied between the input terminal 403 and the input terminal 404.

Figure 14B:
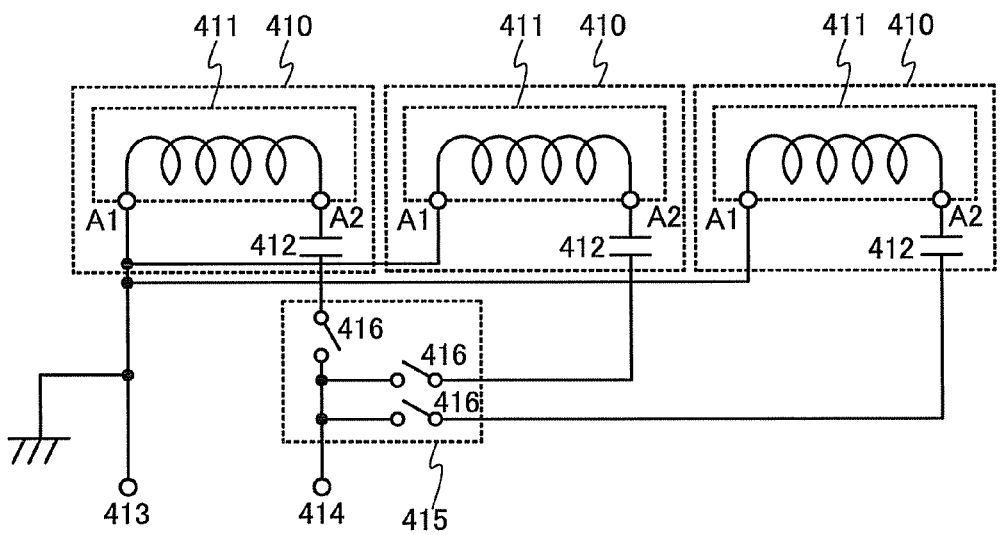

FIG. 14B illustrates an example of a structure of the connection between the plurality of antenna circuits and a selection circuit. As each of a plurality of antenna circuits 410 illustrated in FIG. 14B, a serial LC circuit including the antenna 411 and the capacitor 412 is used as in the case of FIG. 13B.

The feeding point A1 of each of the antennas 411 is connected to the input terminal 413. One of a pair of electrodes of the capacitor 412 is connected to the feeding point A2 and the other is connected to the selection circuit 415. The selection circuit 415 is provided with a plurality of switching elements 416 for controlling connection between the input terminal 414 and the other electrodes of the capacitors 412. By switching between on and off of the switching elements 416, selection from the plurality of antenna circuits 410 is performed.

The antenna circuits 410 selected by turning on the corresponding switching element 416 is given a potential through feeder lines from the input terminal 413 and the input terminal 414. FIG. 14B illustrates a case where a fixed potential such as a ground potential is supplied to the input terminal 413 through a feeder line. An AC voltage is applied between the input terminal 413 and the input terminal 414.

FIGS. 14A and 14B illustrate the cases where each antenna circuit includes a capacitor; however, one embodiment of the present invention is not limited to this structure. Also in the case of using a selection circuit, a plurality of antenna circuits may share one capacitor.

Figure 15A:
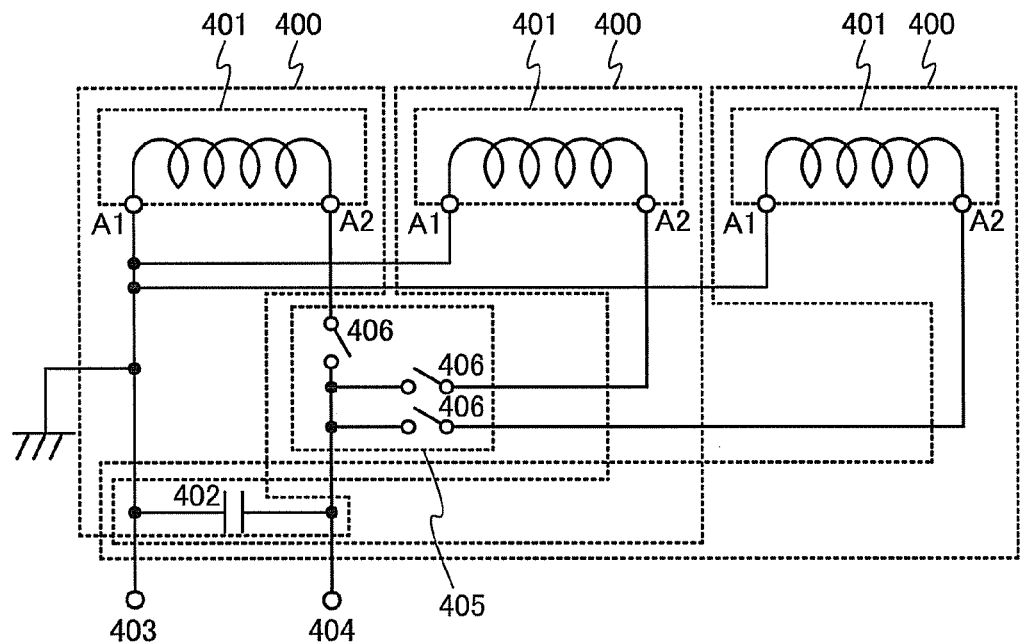
FIGS. 15A and 15B are circuit diagrams of antenna circuits.

FIG. 15A illustrates another example of a structure of the connection between the plurality of antenna circuits and the selection circuit. As each of the plurality of antenna circuits 400 illustrated in FIG. 15A, a parallel LC circuit is used as in the case of FIG. 13A.

Specifically, the plurality of antenna circuits 400 in FIG. 15A each including the antenna 401 share one capacitor 402. The feeding point A1 of each of the antennas 401 is connected to the input terminal 403. Electrodes of the capacitor 402 are respectively connected to the input terminal 403 and the input terminal 404. The selection circuit 405 is provided with the plurality of switching elements 406 for controlling connection between the input terminal 404 and the feeding points A2 of the plurality of antennas 401. By switching between on and off of the switching elements 406, selection from the plurality of antenna circuits 400 is performed.

The antenna circuit 400 selected by turning on the corresponding switching element 406 is given a potential through feeder lines from the input terminal 403 and the input terminal 404. FIG. 15A illustrates a case where a fixed potential such as a ground potential is supplied to the input terminal 403 through a feeder line. An AC voltage is applied between the input terminal 403 and the input terminal 404.

Figure 15B:
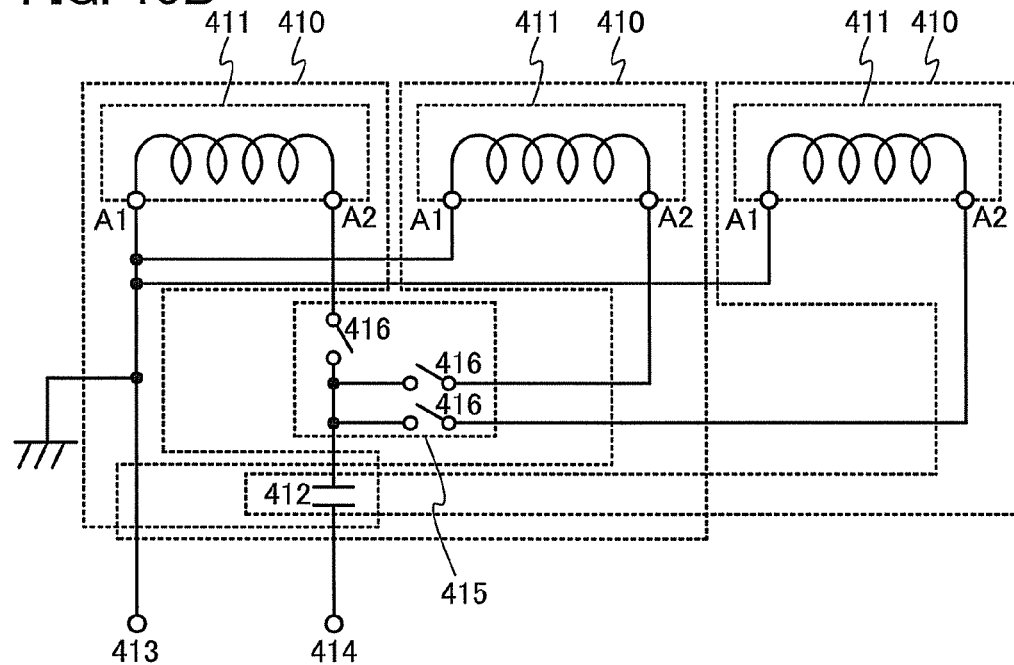

FIG. 15B illustrates an example of another structure of the connection between the plurality of antenna circuits and the selection circuit. As each of the plurality of antenna circuits 410 illustrated in FIG. 15B, a serial LC circuit is used as in the case of FIG. 13B.

Specifically, the plurality of antenna circuits 410 in FIG. 15B each including the antenna 411 share one capacitor 412. The feeding point A1 of each of the antennas 411 is connected to the input terminal 413. One of a pair of electrodes of the capacitor 412 is connected to the selection circuit 415 and the other is connected to the input terminal 414. The selection circuit 415 is provided with the plurality of switching elements 416 for controlling connection between the feeding points A2 of the antennas 411 and the one of the pair of electrodes of the capacitor 412. By switching between on and off of the switching elements 416, selection from the plurality of antenna circuits 410 is performed.

The antenna circuits 410 selected by turning on the corresponding switching element 416 is given a potential through feeder lines from the input terminal 413 and the input terminal 414. FIG. 15B illustrates a case where a fixed potential such as a ground potential is supplied to the input terminal 413 through a feeder line. An AC voltage is applied between the input terminal 413 and the input terminal 414.

As illustrated in FIGS. 15A and 15B, in the case where the plurality of antenna circuits share one capacitor and the selection circuit performs selection from the antenna circuits, it is desirable to set the number of the antenna circuits to be selected in advance. The inductances, the capacitance values of the antennas are desirably equivalent.

In FIGS. 13A and 13B, FIGS. 14A and 14B, and FIGS. 15A and 15B, the antennas are coiled antennas; however, the shape of the antennas which can be used in the present invention is not limited thereto. The shape of the antennas may be selected appropriately depending on the wavelength and the transmission method of radio waves so that a signal is transmitted and received wirelessly.

For example, in the case where a signal is transmitted and received by a microwave method, the impedance of the antenna circuit and that of a circuit portion are matched, whereby loss of power due to reflection can be suppressed and power transmission efficiency can be increased. Reactance corresponding to the imaginary part of impedance depends on the capacitance value of the capacitor in the antenna circuit. Thus, it is desirable to optimize the capacitance value of the capacitor and match the impedances in order to increase power transmission efficiency.

In the case where a signal is transmitted and received by an electromagnetic induction method, the capacitance value of the capacitor in the antenna circuit is optimized to increase power transmission efficiency.

Figure 16A:
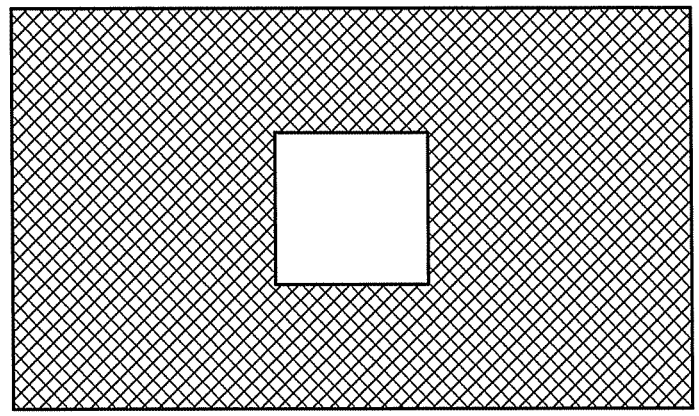
FIGS. 16A to 16C are views each illustrating a shape of an antenna.
Figure 16B:
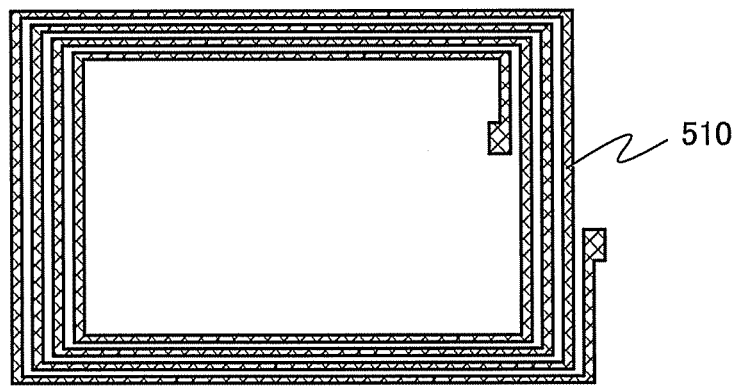
Figure 16C:
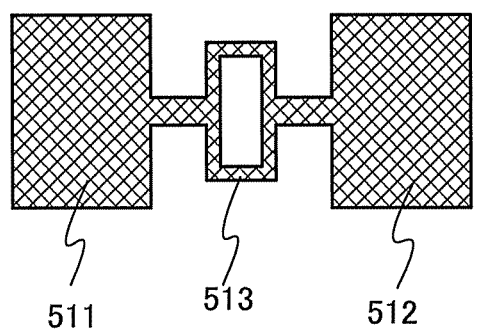

FIGS. 16A to 16C illustrate shapes of antennas. The antenna illustrated in FIG. 16A has a structure where an opening is formed in a rectangular flat plate. The antenna illustrated in FIG. 16B has a structure where a conductor 510 is coiled. The antenna illustrated in FIG. 16C has a structure where a flat patch element 511 and a flat patch element 512 are linked with a loop-shaped wiring 513 interposed therebetween.

Note that the antenna circuit may include a coil for transmitting and receiving radio waves which is not connected to a feeder line physically, such as a booster antenna, in addition to a coil connected to a feeder line at a feeding point. With such a structure, communication distance can be extended.

This embodiment can be implemented in appropriate combination with any of the other embodiments.

Embodiment 9

In this embodiment, the positional relationship between a moving object antenna circuit of a moving object and a power feeding device antenna circuit of a power feeding device will be described.

Figure 17A:
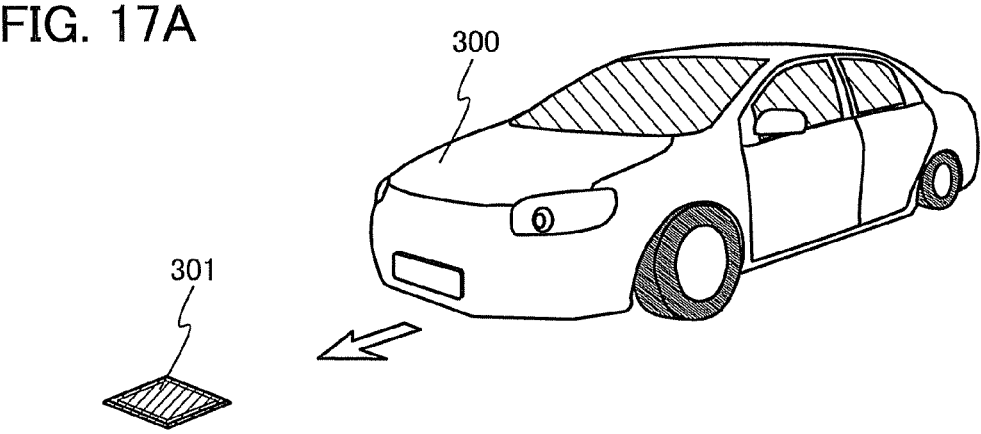
FIGS. 17A to 17C are views illustrating a state where a moving object approaches a power feeding device antenna circuit.

FIG. 17A shows a state where a four-wheeled automobile 300 as one of moving objects approaches a power feeding device antenna circuit 301 of the power feeding device. The automobile 300 approaches the power feeding device antenna circuit 301 in a direction indicated by an arrow.

Figure 17B:
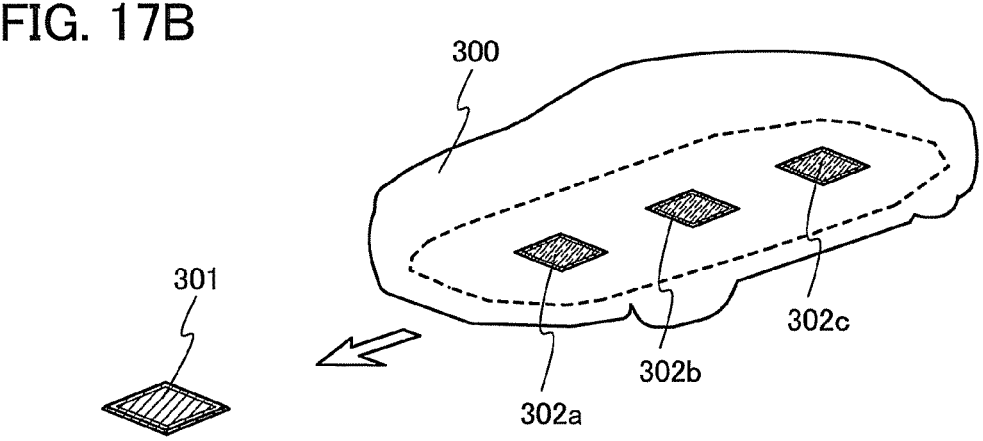

The automobile 300 includes moving object antenna circuits 302a to 302c provided on its bottom portion. In order to clearly show the positions of the moving object antenna circuits 302a to 302c in the automobile 300, FIG. 17B shows the diagrammatic automobile 300 and the moving object antenna circuits 302a to 302c provided on the bottom portion of the automobile 300.

Figure 17C:
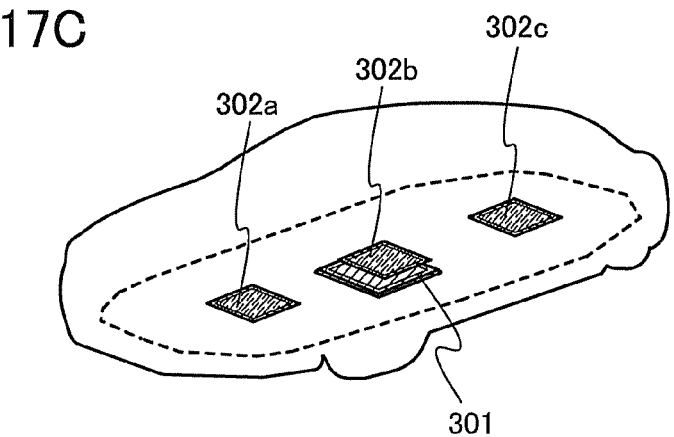

As the automobile 300 moves in the direction of the arrow, the moving object antenna circuits 302a to 302c provided on the bottom portion of the automobile 300 finally become adjacent to the power feeding device antenna circuit 301, as shown in FIG. 17C.

It may be difficult for a driver of the automobile 300 to exactly detect the positional relationship between the power feeding device antenna circuit and the moving object antenna circuit from a driver's seat of the automobile 300 and align the antenna circuits to secure high efficiency conversion, although it depends on where the power feeding device antenna circuit 301 and the moving object antenna circuits 302a to 302c are installed. However, in one embodiment of the present invention, since a test signal transmitted from and received by the power feeding device antenna circuit and the moving object antenna circuit is used to detect the positional relationship without direct perception of the antenna circuits with the eye, the alignment can be easily achieved.

When at least one of the moving object antenna circuits 302a to 302c is placed so as to receive radio waves transmitted from the power feeding device antenna circuit 301, power can be supplied to the automobile 300 efficiently. Thus, compared to the case where the number of moving object antenna circuits is one, tolerance of misalignment between the automobile 300 and the power feeding device antenna circuit 301 in charging can be great and data on the positional relationship can be obtained and the positional relationship can be modified easily.

In addition, if the moving object antenna circuits 302a to 302c are installed on the bottom portion of the automobile 300 and the power feeding device antenna circuit 301 is installed on a surface of a road or the like on which the automobile 300 moves, a certain distance is always provided between the power feeding device antenna circuit and the moving object antenna circuit. Accordingly, the alignment of the antenna circuits may be achieved by moving only the power feeding device antenna circuit 301 on the surface (e.g. a road) on which the automobile 300 moves. Alternatively, this may be achieved by moving only any of the moving object antenna circuits 302a to 302c on a surface (e.g. the bottom surface of the automobile) parallel to the surface on which the automobile 300 moves.

In addition, although efficiency of conversion of energy of radio waves into electric energy depends greatly on a positional relationship in distance, direction, or the like between the power feeding device antenna circuit 301 and the moving object antenna circuits 302a to 302c, the direction of the antenna circuits is fixed in FIGS. 17A to 17C. Accordingly, in FIGS. 17A to 17C, the power feeding device antenna circuit 301 and any one of the moving object antenna circuits 302a to 302c are only necessary to be aligned so that the distance between the antenna circuits is decreased.

Figure 18A:
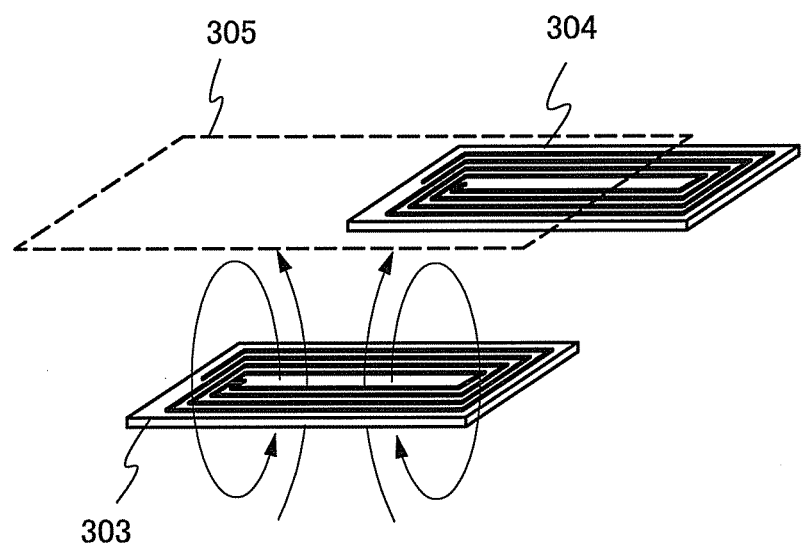
FIGS. 18A and 18B are views each illustrating a state where a power feeding device antenna is adjacent to a moving object antenna.

FIG. 18A shows a state where a power feeding device antenna 303 of the power feeding device antenna circuit 301 is adjacent to a moving object antenna 304 of any one of the moving object antenna circuits 302a to 302c. It is assumed in FIG. 18A that a test signal is transmitted from the power feeding device antenna 303 by radio waves.

It is preferable that the moving object antenna 304 is within an optimal area 305 so that radio waves transmitted from the power feeding device antenna 303 are received efficiently. Since the conversion efficiency increases when the moving object antenna 304 is within the optimal area 305, the moving object antenna 304 can receive a test signal having high intensity. On the contrary, if the moving object antenna 304 is outside the optimal area 305 as shown in FIG. 18A, the conversion efficiency is low; thus, the moving object antenna 304 cannot receive a test signal having high intensity.

Figure 18B:
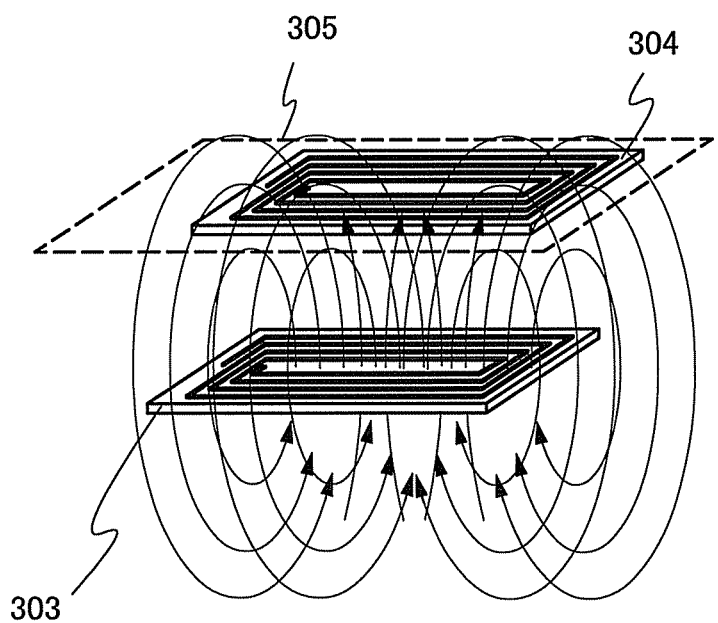

FIG. 18B shows a state where the moving object antenna 304 is within the optimal area 305. It is assumed in FIG. 18B that charging radio waves are transmitted from the power feeding device antenna 303.

As shown in FIG. 18B, since the conversion efficiency is high when the moving object antenna 304 is within the optimal area 305, it is possible to prevent power loss caused when the battery is charged.

A range of the optimal area 305 may be properly set by a designer. For example, in the case where radio waves are transmitted and received by an electromagnetic coupling method, when an alternating current (AC) flows in the power feeding device antenna 303, a magnetic field is generated. If the moving object antenna 304 approaches an area where the magnetic field of the power feeding device antenna 303 is generated, the power feeding device antenna 303 is electromagnetically coupled to the moving object antenna 304, which produces an induced electromotive force in the moving object antenna 304. In general, when the distance between the antennas is the shortest, the antennas can be most significantly influenced by a magnetic field. Accordingly, when an area in which a magnetic field generated in the power feeding device antenna 303 is the strongest (an area in which the distance between the antennas is the shortest) is set as the optimal area 305, the induced electromotive force generated in the moving object antenna 304 can greatly increases, whereby the conversion efficiency can be increased.

This embodiment can be implemented in appropriate combination with any of the other embodiments.

Embodiment 10

In this embodiment, a structure of a power feeding device which can facilitate alignment in the case of using a moving object, such as an automobile, which moves not on a rail, will be described.

Figure 19A:
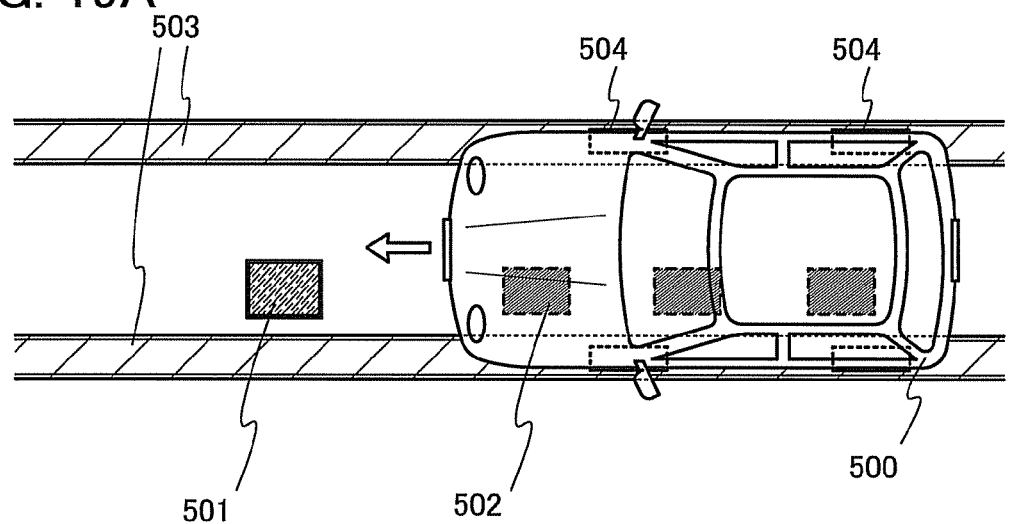
FIGS. 19A and 19B are views illustrating a power feeding device and a moving object.

FIG. 19A shows a state where a four-wheeled automobile 500 as one type of moving object approaches a power feeding device antenna circuit 501 of the power feeding device. The automobile 500 approaches the power feeding device antenna circuit 501 in a direction indicated by an arrow.

The automobile 500 has a driving wheel 504 which is included in a driving portion and is actuated using mechanical energy from an electric motor. As the driving wheel 504 is rotated, the automobile 500 can be driven. In this embodiment, as shown in FIG. 19A, in order to restrict a direction in which the automobile is driven, a guide 503 to fix a direction of a shaft of the driving wheel 504 is installed in the power feeding device. Accordingly, the driving wheel 504 rotates and moves along a direction in which the guide 503 extends.

Figure 19B:
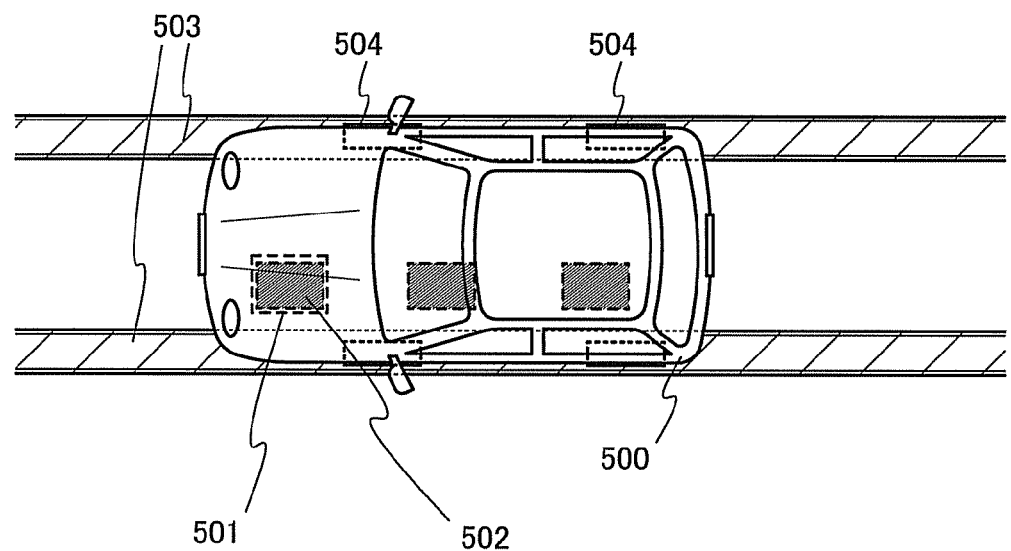

The automobile 500 has a plurality of moving object antenna circuits 502 provided on its bottom portion. As the automobile 500 moves in the arrow direction, one of the moving object antenna circuits 502 provided on the bottom portion of the automobile 500 is finally positioned adjacent to the power feeding device antenna circuit 501, as shown in FIG. 19B.

As in this embodiment, by using the guide 503, it is only necessary to align the power feeding device antenna circuit 501 and the moving object antenna circuits 502 in the direction in which the guide 503 extends. This can facilitate alignment further.

This embodiment can be implemented in appropriate combination with any of the other embodiments.

Embodiment 11

In one embodiment of the present invention, examples of moving objects include moving means driven by an electric motor using power stored in a secondary battery, such as automobiles (automatic two-wheeled cars, three or more-wheeled automobiles), motorized bicycles including a motor-assisted bicycle, aircrafts, boats, and railroad cars.

Figure 20A:
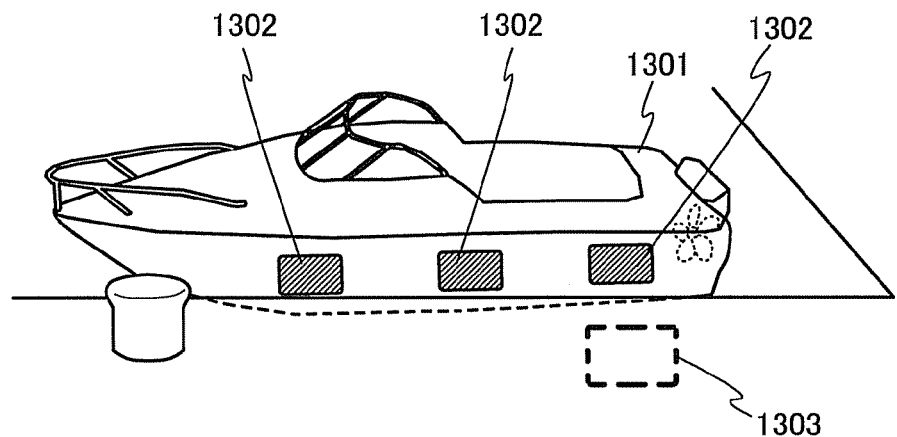
FIGS. 20A and 20B are views each illustrating a moving object.

FIG. 20A shows a structure of a motor boat 1301 as one of the moving objects of the present invention. FIG. 20A illustrates the case where the motor boat 1301 includes a plurality of moving object antenna circuits 1302 equipped on a side of the body of the boat. For example, a power feeding device for charging the motor boat 1301 may be equipped at a mooring in a harbor. In addition, by equipping a power feeding device antenna circuit 1303 at a dike such as a quay in the mooring, it is possible to charge the motor boat 1301 with power loss suppressed while the motor boat 1301 is anchored. If the charging can be achieved by wireless communication, the trouble of removing a secondary battery from the motor boat 1301 for every charging can be saved.

Figure 20B:
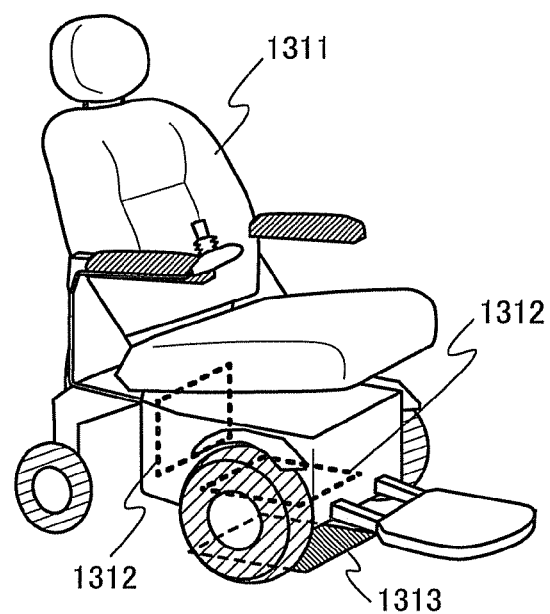

FIG. 20B shows a structure of an electric wheelchair 1311 as one of the moving objects of the present invention. FIG. 20B illustrates the case where the electric wheelchair 1311 includes a plurality of moving object antenna circuits 1312 provided on its bottom portion and its back portion, as an example. FIG. 20B illustrates the case where a power feeding device antenna circuit 1313 of a power feeding device for charging the electric wheelchair 1311 may be installed on a surface of a road or the like on which the electric wheelchair 1311 lies, as example. In FIG. 20B, the plurality of moving body antenna circuits 1312 are placed on the electric wheelchair 1311 so as to face different directions; therefore, even a power feeding device according to another embodiment can perform charging. For example, even in the case where a power feeding device antenna circuit is placed on a side surface of a power feeding device, charging can be performed with the use of the moving object antenna circuit 1312 provided on the back of the electric wheelchair 1311 and alignment can also be performed corresponding to the power feeding device according to the another embodiment.

This embodiment can be implemented in appropriate combination with any of the other embodiments.

Embodiment 12

In this embodiment, a configuration of a rectifier circuit used in a moving object and configurations of transistors included in various circuits of the moving object will be described.

Figure 21A:
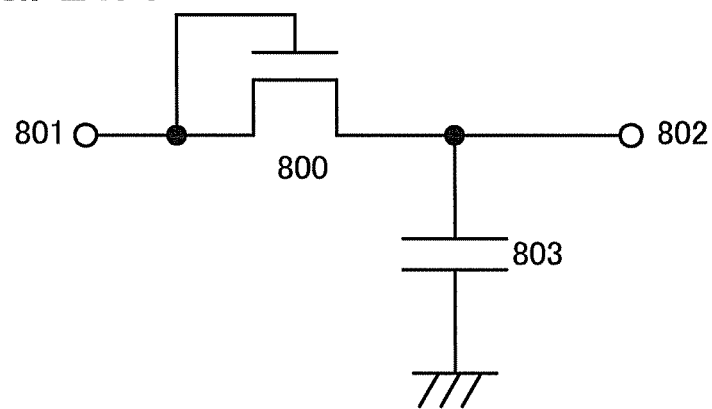
FIGS. 21A and 21B are circuit diagrams of rectifier circuits.

FIG. 21A shows an example of a half-wave rectifier circuit as one type of rectifier circuit. The rectifier circuit shown in FIG. 21A includes a transistor 800 and a capacitor 803. One of a source electrode and a drain electrode of the transistor 800 is connected to an input terminal 801, while the other is connected to an output terminal 802. A gate electrode of the transistor 800 is connected to the input terminal 801. One of a pair of electrodes of the capacitor 803 is connected to the output terminal 802, while the other is connected to the ground (GND).

Figure 21B:
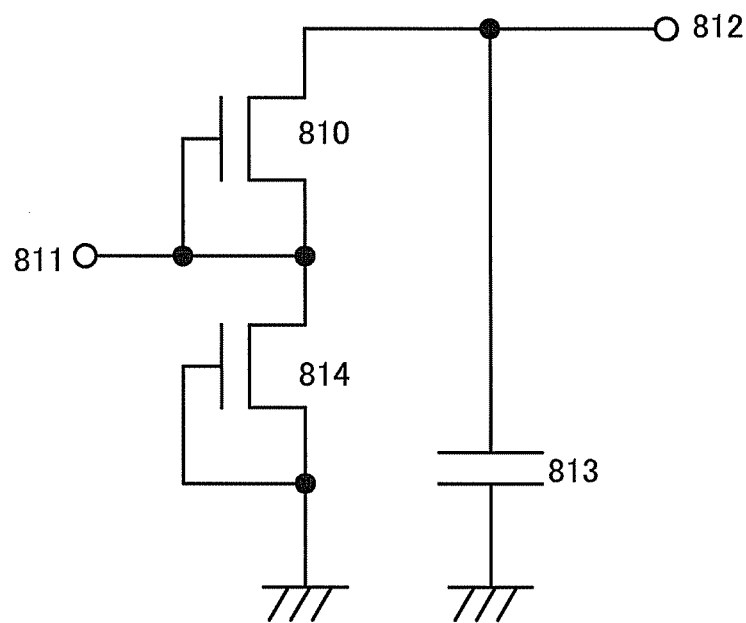

FIG. 21B shows an example of a half-wave voltage-doubler rectifier circuit as one type of rectifier circuit. The rectifier circuit shown in FIG. 21B includes a transistor 810, a transistor 814, and a capacitor 813. One of a source electrode and a drain electrode of the transistor 810 is connected to an input terminal 811, while the other is connected to an output terminal 812. A gate electrode of the transistor 810 is connected to the input terminal 811. One of a source electrode and a drain electrode of the transistor 814 is connected to the input terminal 811, while the other is connected to the ground (GND). A gate electrode of the transistor 814 is connected to the ground (GND). One of a pair of electrodes of the capacitor 813 is connected to the output terminal 812, while the other is connected to the ground (GND).

The rectifier circuit of the moving object is not limited to the configurations shown in FIGS. 21A and 21B. For example, instead of the half-wave voltage-doubler rectifier circuit, any of the other half-wave rectifier circuits such as a half-wave voltage-quadrupler rectifier circuit or a half-wave voltage-sixtupler rectifier circuit, and a full-wave rectifier circuit may be used.

In addition, although it is illustrated that separate elements are connected to each other in the circuit diagrams, in reality, one conductive film may have functions of a plurality of elements, such as a portion of a wiring functioning as an electrode. As used herein, the term "connection" includes the case where one conductive film has functions of a plurality of elements.

In addition, a source electrode and a drain electrode of a transistor may be interchangeably referred to depending on polarity of the transistor and a difference between potentials given to electrodes. In general, in an n-channel transistor, an electrode with a low potential is called a source electrode, whereas an electrode with a high potential is called a drain electrode. In a p-channel transistor, an electrode with a low potential is called a drain electrode, whereas an electrode with a high potential is called a source electrode. In this specification, although the connection relationship of the transistor is sometimes described under the assumption that a source electrode and a drain electrode are fixed for the sake of convenience, in reality, the source electrode and the drain electrode may be interchangeably referred to depending on the potential relationship.

Next, a configuration of a transistor used in a rectifier circuit, a power supply circuit, a signal processing circuit, a modulation circuit, a demodulation circuit, a selection circuit, and the like will be described. In one embodiment of the present invention, a configuration of a transistor used in any of the above-mentioned circuits is not particularly limited, but a transistor which can control a high withstanding voltage and a high current is desirably used. In addition, if a range of temperatures under environments where the moving object is used is wide, a transistor whose characteristics change very little depending on temperature is desirably used.

An example of a transistor which meets the requirement described above may include a transistor which uses, as semiconductor material, a compound semiconductor such as silicon carbide (SiC) or gallium nitride (GaN), or an oxide semiconductor formed of metal oxide such as zinc oxide (ZnO), both of which have a wider band gap than a silicon semiconductor and a lower intrinsic carrier density than silicon. Among them, the oxide semiconductor has the advantage that it can be fabricated using a sputtering method or a wet method (a printing method or the like) and has good mass productivity. While silicon carbide and gallium nitride can not have sufficient characteristics unless they are monocrystalline and process temperatures for monocrystallization of silicon carbide and gallium nitride are about 1500° C. and about 1100° C., respectively, a film forming temperature of the oxide semiconductor is low, for example, 300° C. to 500° C. (about 700° C. at a maximum) and a semiconductor element including the oxide semiconductor can be stacked on an integrated circuit including a semiconductor material such as single crystal silicon. In addition, larger substrates can be used. Accordingly, among the above-mentioned wide gap semiconductors, the oxide semiconductor has the advantage of being able to be mass produced. In addition, a crystalline oxide semiconductor having better performance (for example, field effect mobility) can be easily obtained by thermal treatment at 450° C. to 800° C.

A highly purified oxide semiconductor (OS) with reduced impurities such as moisture and hydrogen as electron donors (donors) is i-type (an intrinsic semiconductor) or substantially i-type. Thus, a transistor including the oxide semiconductor has a characteristic of very low off-state current or leak current. Specifically, the highly purified oxide semiconductor has a measurement value of hydrogen concentration of $5 \times 10^{19}/cm^3$ or less, preferably $5 \times 10^{18}/cm^3$ or less, more preferably $5 \times 10^{17}/cm^3$ or less, still more preferably $1 \times 10^{16}/cm^3$ or less, when measurement is performed using secondary ion mass spectrometry (SIMS). In addition, the carrier density of the oxide semiconductor which can be measured by Hall effect measurement is less than $1 \times 10^{14}/cm^3$, preferably less than $1 \times 10^{12}/cm^3$, more preferably less than $1 \times 10^{11}/cm^3$. In addition, the band gap of the oxide semiconductor is 2 eV or more, preferably 2.5 eV or more, more preferably 3 eV or more. By using a highly purified oxide semiconductor film with sufficiently reduced concentration of impurities such as moisture and hydrogen, off-state current or leak current of the transistor can be reduced.

Here, an analysis on the hydrogen concentration of the oxide semiconductor film will be mentioned. Measurements of the hydrogen concentration of the oxide semiconductor film and the hydrogen concentration of the conductive film are performed by SIMS. In principle, it is known that it is hard to obtain precise data on the vicinity of a sample surface or the vicinity of an interface with a film including a different material by SIMS. Therefore, when a distribution of hydrogen concentrations of the film in its thickness direction is analyzed by SIMS, an average value in a region in which values do not extremely vary and are substantially the same in a range where the target film exists is employed as the hydrogen concentration. In addition, if the thickness of the film is small, a region in which substantially the same values are obtained cannot be found in some cases because the film is influenced by the hydrogen concentration of an adjacent film. In this case, the maximum or minimum of the concentration of hydrogen in the region in which the film exists is employed as the hydrogen concentration of the film. In addition, if there is no mountain-like peak having a maximum value and no valley-like peak having a minimum value in the region in which the film exists, a value at an inflection point is employed as the hydrogen concentration.

Specifically, it can be proved by various experiments that a transistor including a highly purified oxide semiconductor film as an active layer has low off-state current. For example, even an element having a channel width of $1 \times 10^6$ μm and a channel length of 10 μm can have the characteristic of having an off-state current (a drain current in the case where a voltage between a gate electrode and a source electrode is 0 V or less) of the measurement limit or less of a semiconductor parameter analyzer, i.e., $1\times10^{-13}$ A or less, in a range of 1 V to 10 V of a voltage between the source electrode and the drain electrode (a drain voltage). In this case, it can be seen that the off-state current density corresponding to a value obtained by dividing the off-state current by the channel width of the transistor is 100 zA/μm or less. In addition, in an experiment using a circuit where a capacitor is connected to a transistor (the thickness of a gate insulating film is 100 nm) and charges flowing in or out of the capacitor are controlled by the transistor, when a highly purified oxide semiconductor film is used for a channel formation region of the transistor, a measurement of the off-state current density of the transistor from variation of charges of the capacitor per unit time shows 10 zA/μm to 100 zA/μm, which is further low, in the case where the voltage between the source electrode and the drain electrode of the transistor is 3 V. Accordingly, the off-state current density of the transistor including the highly purified oxide semiconductor film as an active layer can be 100 zA/μm or less, preferably 10 zA/μm or less, more preferably 1 zA/μm or less depending on the voltage between the source electrode and the drain electrode. Accordingly, a transistor including the highly purified oxide semiconductor film as an active layer has even lower off-state current than a transistor including crystalline silicon.

A transistor including the above-described oxide semiconductor for a channel formation region is desirably used for an element required to have the characteristic of low off-state current, such as a switching element of a modulation circuit.

The off-state current of a transistor including a highly purified oxide semiconductor hardly depends on temperature. This is because the oxide semiconductor is made to be as close to intrinsic as possible by removing impurities as electron donors (donors) in the oxide semiconductor to highly purify the oxide semiconductor, so that the Fermi level is located in a center of the forbidden band. In addition, this is because an energy gap of the oxide semiconductor is 3 eV or more and there are very few thermally-excited carriers. In addition, degeneration of the source electrode and the drain electrode is also a cause of no temperature dependence. The transistor is mostly operated by carriers injected into the oxide semiconductor from the degenerated source electrode and the carrier density has no dependence on temperature; therefore, the off-state current has no dependence on temperature.

Examples of the oxide semiconductor include a quaternary metal oxide such as an In—Sn—Ga—Zn—O-based oxide semiconductor; ternary metal oxides such as an In—Ga—Zn—O-based oxide semiconductor, an In—Sn—Zn—O-based oxide semiconductor, an In—Al—Zn—O-based oxide semiconductor, an Sn—Ga—Zn—O-based oxide semiconductor, an Al—Ga—Zn—O-based oxide semiconductor, and an Sn—Al—Zn—O-based oxide semiconductor; binary metal oxides such as an In—Zn—O-based oxide semiconductor, an Sn—Zn—O-based oxide semiconductor, an Al—Zn—O-based oxide semiconductor, a Zn—Mg—O-based oxide semiconductor, an Sn—Mg—O-based oxide semiconductor, an In—Mg—O-based oxide semiconductor, and an In—Ga—O-based oxide semiconductor; an In—O-based oxide semiconductor; an Sn—O-based oxide semiconductor; and a Zn—O-based oxide semiconductor. In this specification, the term "In—Sn—Ga—Zn—O-based oxide semiconductor" means metal oxide containing Indium (In), tin (Sn), gallium (Ga), and zinc (Zn) and may have any stoichiometric composition. In addition, the oxide semiconductor may contain silicon.

The oxide semiconductor may be expressed by a chemical formula, $InMO_3(ZnO)_m$ (m>0). Here, M represents one or more metal elements selected from Go, Al, Mn, and Co.

FIGS. 22A to 22D each show a structure of a transistor including an oxide semiconductor, which is formed over transistors including silicon. The silicon used may be either a thin semiconductor film or a bulk semiconductor substrate. In this embodiment, a structure in the case where a transistor including an oxide semiconductor is formed over transistors formed using a silicon-on-insulator (SOI) substrate will be described by way of an example.

Figure 22A:
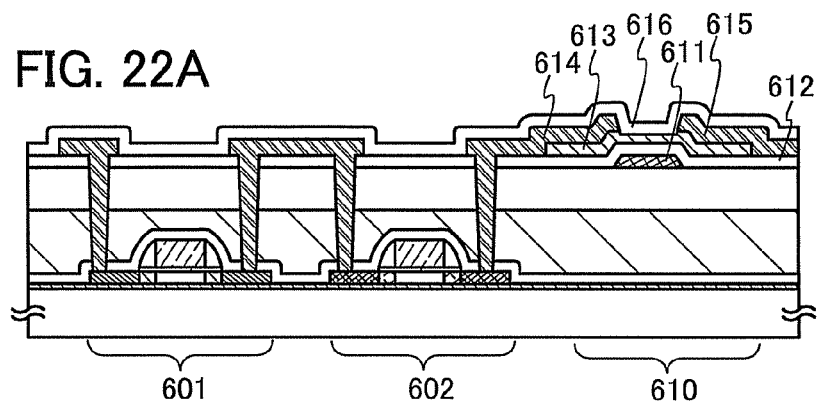
FIGS. 22A to 22D are views each illustrating a structure of a transistor.

FIG. 22A shows a transistor 601 and a transistor 602 which are formed using an SOI substrate. In addition, a channel-etched bottom-gate transistor 610 including an oxide semiconductor film is formed over the transistor 601 and the transistor 602.

The transistor 610 includes a gate electrode 611, a gate insulating film 612 over the gate electrode 611, an oxide semiconductor film 613 which is over the gate insulating film 612 and overlaps with the gate electrode 611, and a source electrode 614 and a drain electrode 615 which are a pair and formed over the oxide semiconductor film 613. In addition, the transistor 610 may further include an insulating film 616 formed over the oxide semiconductor film 613 as its component. The transistor 610 has a channel-etched structure where a portion of the oxide semiconductor film 613 is exposed between the source electrode 614 and the drain electrode 615.

In addition, the transistor 610 may further include a back gate electrode over the insulating film 616. The back gate electrode is formed to overlap with a channel formation region of the oxide semiconductor film 613. The back gate electrode may be in either a floating state where the electrode is electrically isolated, or a state where the electrode is given a potential. In the latter, the back gate electrode may be given the same potential as the gate electrode 611 or a fixed potential such as a ground potential. By controlling the potential supplied to the back gate electrode, it is possible to set the threshold voltage of the transistor 610.

Figure 22B:
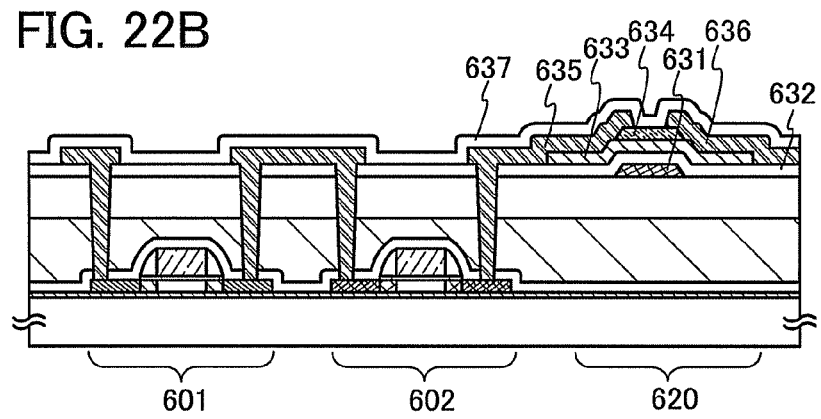

FIG. 22B shows the transistor 601 and the transistor 602 which are formed using an SOI substrate. In addition, a channel-protective bottom-gate transistor 620 including an oxide semiconductor film is formed over the transistor 601 and the transistor 602.

The transistor 620 includes a gate electrode 631, a gate insulating film 632 over the gate electrode 631, an oxide semiconductor film 633 which is over the gate insulating film 632 and overlaps with the gate electrode 631, a channel protective film 634 which is formed over the island-like oxide semiconductor film 633 at a position overlapping with the gate electrode 631, and a source electrode 635 and drain electrode 636 which are formed over the oxide semiconductor film 633. In addition, the transistor 620 may further include an insulating film 637 formed over the source electrode 635 and drain electrode 636 as its component.

The channel protective film 634 is provided to prevent damage (for example, film reduction due to plasma or an etchant in etching) of a portion of the oxide semiconductor film 633, which is to be a channel formation region, in a later step. This can improve reliability of the transistor.

By using an oxygen-containing inorganic material for the channel protective film 634, even if oxygen deficiency in the oxide semiconductor film 633 is generated due to heat treatment for reduction of moisture and hydrogen, oxygen can be supplied to a region of the oxide semiconductor film 633, which is in contact with at least the channel protective film 634, thereby reducing the oxygen deficiency as a donor to obtain a structure which satisfies the stoichiometric composition. Thus, the channel formation region can be made to be i-type or substantially i-type and variation of electric characteristics of the transistor due to oxygen deficiency can be reduced, which result in improvement of the electric characteristics.

In addition, the transistor 620 may further include a back gate electrode over the insulating film 637. The back gate electrode is formed to overlap with a channel formation region of the oxide semiconductor film 633. The back gate electrode may be in either a floating state where the electrode is electrically isolated, or a state where this electrode is given a potential. In the latter, the back gate electrode may be given the same potential as the gate electrode 631 or a fixed potential such as a ground potential. By controlling the potential supplied to the back gate electrode, it is possible to set the threshold voltage of the transistor 620.

Figure 22C:
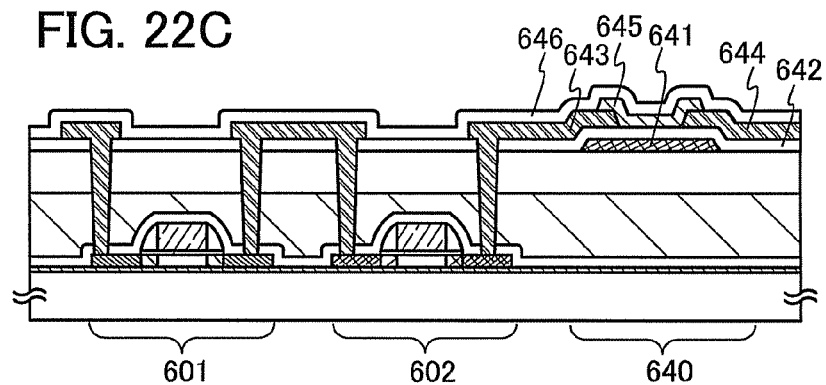

FIG. 22C shows the transistor 601 and the transistor 602 which are formed using an SOI substrate. In addition, a bottom-contact transistor 640 including an oxide semiconductor film is formed over the transistor 601 and the transistor 602.

The transistor 640 includes a gate electrode 641, a gate insulating film 642 over the gate electrode 641, a source electrode 643 and a drain electrode 644 which are over the gate insulating film 642, and an oxide semiconductor film 645 which overlaps with the gate electrode 641. In addition, the transistor 640 may further include an insulating film 646 formed on the oxide semiconductor film 645 as its component.

In addition, the transistor 640 may further include a back gate electrode over the insulating film 646. The back gate electrode is formed to overlap with a channel formation region of the oxide semiconductor film 645. The back gate electrode may be in either a floating state where the electrode is electrically isolated, or a state where this electrode is given a potential. In the latter, the back gate electrode may be given the same potential as the gate electrode 641 or a fixed potential such as a ground potential. By controlling the potential supplied to the back gate electrode, it is possible to set the threshold voltage of the transistor 640.

Figure 22D:
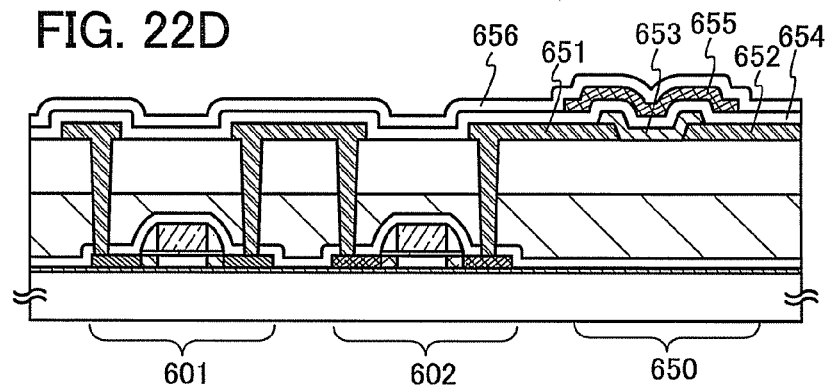

FIG. 22D shows the transistor 601 and the transistor 602 which are formed using an SOI substrate. In addition, a top-gate transistor 650 including an oxide semiconductor film is formed over the transistor 601 and the transistor 602.

The transistor 650 includes a source electrode 651 and a drain electrode 652, an oxide semiconductor film 653 which is formed over the source electrode 651 and the drain electrode 652, a gate insulating film 654 over the oxide semiconductor film 653, and a gate electrode 655 which is over the gate insulating film 654 and overlaps with the oxide semiconductor film 653. In addition, the transistor 650 may further include an insulating film 656 formed on the gate electrode 655 as its component.

Although all of the above-described transistors have single-gate structures in the drawings, they may have multi-gate structures including a plurality of electrically connected gate electrodes, that is, a plurality of channel formation regions.

This embodiment can be implemented in appropriate combination with any of the other embodiments.

This application is based on Japanese Patent Application serial no. 2010-028706 filed with Japan Patent Office on Feb. 12, 2010, the entire contents of which are hereby incorporated by reference.

What is claimed is:

1. A moving object comprising:
a plurality of antennas each configured to generate a first electric signal from a first radio wave and a second electric signal from a second radio wave, wherein each of the first radio wave and the second radio wave is transmitted from a power feeding device provided outside the moving object;
a signal processing circuit configured to extract data on positional relationships between the power feeding device and the plurality of antennas with usage of the first electric signals;
a secondary battery configured to store electric energy with usage of the second electric signals; and
an electric motor configured to receive the electric energy from the secondary battery,
wherein a frequency band of the first radio wave and a frequency band of the second radio wave are different,
wherein the signal processing circuit comprises a first transistor and a second transistor over the first transistor,
wherein the first transistor comprises crystalline silicon, and
wherein the second transistor comprises crystalline oxide semiconductor.

2. The moving object according to claim 1, further comprising:
a selection circuit configured to select an antenna from the plurality of antennas based on intensities of the first electric signals,
wherein the signal processing circuit is configured to compare the intensities of the first electric signals.

3. The moving object according to claim 1, wherein the moving object is one selected from the group consisting of automobiles, motorized bicycles, aircrafts, boats, and railroad cars.

4. The moving object according to claim 1, wherein an intensity of the first radio wave is lower than an intensity of the second radio wave.

5. A wireless power feeding system comprising:
a power feeding device having a first antenna; and
a moving object,
wherein the moving object comprises:
a plurality of second antennas each configured to generate a first electric signal from a first radio wave and a second electric signal from a second radio wave;
a signal processing circuit configured to extract data on positional relationships between the first antenna and the plurality of second antennas with usage of the first electric signals; and
a secondary battery configured to store electric energy with usage of the second electric signals,
wherein each of the first radio wave and the second radio wave is transmitted from the first antenna,
wherein a frequency band of the first radio wave and a frequency band of the second radio wave are different,
wherein the power feeding device is provided outside the moving object,
wherein the signal processing circuit comprises a first transistor and a second transistor over the first transistor, wherein the first transistor comprises crystalline silicon, and wherein the second transistor comprises crystalline oxide semiconductor.

6. The wireless power feeding system according to claim 5, further comprising:
a selection circuit configured to select a second antenna from the plurality of second antennas based on intensities of the first electric signals,
wherein the signal processing circuit is configured to compare the intensities of the first electric signals.

7. The wireless power feeding system according to claim 5, wherein the moving object is one selected from the group consisting of automobiles, motorized bicycles, aircrafts, boats, and railroad cars.

8. The wireless power feeding system according to claim 5, wherein an intensity of the first radio wave is lower than an intensity of the second radio wave.

9. The wireless power feeding system according to claim 5, wherein the electric energy is configured to be supplied to an electric motor provided on the moving object.

10. A wireless power feeding system comprising:
a power feeding device having a plurality of first antennas; and
a moving object,
wherein the moving object comprises:
a plurality of second antennas each configured to generate first electric signals from first radio waves and a second electric signal from a second radio wave;
a signal processing circuit configured to extract data on positional relationships between the plurality of first antennas and the plurality of second antennas with usage of the first electric signals; and
a secondary battery configured to store electric energy with usage of the second electric signal,
wherein the first radio waves are transmitted from the plurality of first antennas,
wherein the second radio wave is transmitted from one of the plurality of first antennas,
wherein a frequency band of the first radio wave and a frequency band of the second radio wave are different,
wherein the power feeding device is provided outside the moving object,
wherein the signal processing circuit comprises a first transistor and a second transistor over the first transistor,
wherein the first transistor comprises crystalline silicon, and
wherein the second transistor comprises crystalline oxide semiconductor.

11. The wireless power feeding system according to claim 10, further comprising:
a selection circuit configured to select a first antenna from the plurality of first antennas based on intensities of the first electric signals,
wherein the signal processing circuit is configured to compare the intensities of the first electric signals.

12. The wireless power feeding system according to claim 10, wherein the moving object is one selected from the group consisting of automobiles, motorized bicycles, aircrafts, boats, and railroad cars.

13. The wireless power feeding system according to claim 10, wherein intensities of the first radio waves are lower than an intensity of the second radio wave.

14. The wireless power feeding system according to claim 10, wherein the electric energy is configured to be supplied to an electric motor provided on the moving object.

15. A wireless power feeding method comprising:
generating first electric signals from a first radio wave which is transmitted from a power feeding device to a plurality of antennas of a moving object;
modifying a positional relationship between the power feeding device and the moving object based on intensities of the first electric signals;
generating second electric signals from a second radio wave which is transmitted from the power feeding device to the plurality of antennas; and
storing electric energy in a secondary battery with usage of the second electric signals,
wherein each of the plurality of antennas is configured to generate the first electric signal and the second electric signal,
wherein a frequency band of the first radio wave and a frequency band of the second radio wave are different,
wherein the power feeding device is outside the moving object,
wherein the moving object comprises a signal processing circuit
wherein the signal processing circuit comprises a first transistor and a second transistor over the first transistor,
wherein the first transistor comprises crystalline silicon, and
wherein the second transistor comprises crystalline oxide semiconductor.

16. The wireless power feeding method according to claim 15, further comprising:
selecting an antenna from the plurality of antennas based on the intensities of the first electric signals.

17. The wireless power feeding method according to claim 15, wherein the moving object is one selected from the group consisting of automobiles, motorized bicycles, aircrafts, boats, and railroad cars.

18. The wireless power feeding method according to claim 15, wherein an intensity of the first radio wave is lower than an intensity of the second radio wave.

19. The wireless power feeding method according to claim 15, further comprising:
supplying the electric energy stored in the secondary battery to an electric motor provided on the moving object.

20. A wireless power feeding method comprising:
generating first electric signals from first radio waves which are transmitted from a plurality of first antennas of a power feeding device to a plurality of second antennas of a moving object;
selecting a first antenna from the plurality of first antennas based on intensities of the first electric signals;
generating a second electric signal from a second radio wave which is transmitted from the selected first antenna to the plurality of second antennas; and
storing electric energy in a secondary battery with usage of the second electric signal,
wherein each of the plurality of second antennas is configured to generate the first electric signals and the second electric signal,
wherein a frequency band of the first radio wave and a frequency band of the second radio wave are different,
wherein the power feeding device is outside the moving object, wherein the moving object comprises a signal processing circuit wherein the signal processing circuit comprises a first transistor and a second transistor over the first transistor, wherein the first transistor comprises crystalline silicon, and wherein the second transistor comprises crystalline oxide semiconductor.

21. The wireless power feeding method according to claim 20, wherein the moving object is one selected from the group consisting of automobiles, motorized bicycles, aircrafts, boats, and railroad cars.

22. The wireless power feeding method according to claim 20, wherein intensities of the first radio waves are lower than an intensity of the second radio wave.

23. The wireless power feeding method according to claim 20, further comprising:

supplying the electric energy stored in the secondary battery to an electric motor provided on the moving object.

* * * * *